United States Patent
Koslov et al.

(10) Patent No.: US 9,716,567 B2
(45) Date of Patent: Jul. 25, 2017

(54) RATELESS CODES DECODING METHOD FOR COMMUNICATIONS SYSTEMS

(75) Inventors: Joshua Lawrence Koslov, Hopewell, NJ (US); Wen Gao, West Windsor, NJ (US); Yik Chung Wu, West Windsor, NJ (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 988 days.

(21) Appl. No.: 12/448,224

(22) PCT Filed: Dec. 14, 2006

(86) PCT No.: PCT/US2006/047911
§ 371 (c)(1),
(2), (4) Date: Jun. 12, 2009

(87) PCT Pub. No.: WO2008/073103
PCT Pub. Date: Jun. 19, 2008

(65) Prior Publication Data
US 2010/0067568 A1  Mar. 18, 2010

(51) Int. Cl.
*H04B 7/02* (2017.01)
*H04L 1/02* (2006.01)
(Continued)

(52) U.S. Cl.
CPC .......... *H04L 1/0003* (2013.01); *H04L 1/0016* (2013.01); *H04L 1/0025* (2013.01);
(Continued)

(58) Field of Classification Search
CPC ................................................ H03M 13/3761
See application file for complete search history.

(56) References Cited

U.S. PATENT DOCUMENTS

| 5,428,637 A | 6/1995 | Oliva, Jr. et al. |
| 7,017,104 B1 | 3/2006 | Chen et al. |
| (Continued) | | |

FOREIGN PATENT DOCUMENTS

| CN | 1238075 | 12/1999 |
| CN | 1433228 A | 7/2003 |
| (Continued) | | |

OTHER PUBLICATIONS

Ashikhmin et al., "Algebraic Coding Theory and Information Theory", DIMACS Workshop, Dec. 15-18, 2003, vol. 68, Piscataway, NJ.

(Continued)

*Primary Examiner* — Shuwang Liu
*Assistant Examiner* — Gina McKie
(74) *Attorney, Agent, or Firm* — Brian J. Dorini; Catherine A. Cooper

(57) ABSTRACT

A method and apparatus for improving performance in communication systems is provided. In one implementation, initial encoded data that has been encoded with a rateless code is received. A quality metric is determined for a communication medium on which the initial encoded data has been received. A modulation scheme used in sending the initial encoded data on the communication medium is identified. An estimate is determined, based on the identified modulation scheme and the determined quality metric, of an amount of mutual information being received per unit of received encoded data. An amount of mutual information being received is determined, based on the determined estimate.

22 Claims, 37 Drawing Sheets

(51) Int. Cl.
- *H04L 1/00* (2006.01)
- *H04L 1/18* (2006.01)
- *H04L 1/06* (2006.01)
- *H04L 1/16* (2006.01)

(52) U.S. Cl.
CPC .......... *H04L 1/1848* (2013.01); *H04L 1/0656* (2013.01); *H04L 1/1671* (2013.01)

(56) References Cited

U.S. PATENT DOCUMENTS

| | | | |
|---|---|---|---|
| 7,124,343 B2 | 10/2006 | Moulsley et al. | |
| 7,155,170 B2 | 12/2006 | Miyoshi et al. | |
| 7,386,277 B2 | 6/2008 | Cho et al. | |
| 7,408,913 B2 | 8/2008 | Khan | |
| 7,434,137 B2 | 10/2008 | Itoh et al. | |
| 7,472,200 B1 | 12/2008 | Taylor et al. | |
| 7,508,748 B2 * | 3/2009 | Kadous | 370/208 |
| 7,508,791 B2 * | 3/2009 | Kalhan et al. | 370/329 |
| 7,720,504 B2 | 5/2010 | Murata et al. | |
| 7,924,761 B1 | 4/2011 | Stevens | |
| 7,953,428 B2 | 5/2011 | Shimizu et al. | |
| 8,149,810 B1 | 4/2012 | Narasimhan et al. | |
| 8,428,042 B1 | 4/2013 | Chion et al. | |
| 2001/0025361 A1 | 9/2001 | Kim | |
| 2001/0051530 A1 | 12/2001 | Shiotsu et al. | |
| 2002/0013922 A1 | 1/2002 | Gueguen | |
| 2002/0106989 A1 | 8/2002 | Aizawa et al. | |
| 2003/0022629 A1 | 1/2003 | Miyoshi et al. | |
| 2003/0039218 A1 | 2/2003 | Kwak | |
| 2003/0048857 A1 | 3/2003 | Onggosanusi et al. | |
| 2003/0063587 A1 | 4/2003 | Cho et al. | |
| 2003/0095506 A1 | 5/2003 | Jalali et al. | |
| 2003/0165120 A1 | 9/2003 | Uesugi et al. | |
| 2003/0210668 A1 | 11/2003 | Malladi et al. | |
| 2004/0002309 A1 | 1/2004 | Ashikhmin et al. | |
| 2004/0004998 A1 | 1/2004 | Fitton et al. | |
| 2004/0022213 A1 | 2/2004 | Choi et al. | |
| 2004/0218899 A1 | 11/2004 | Oyama et al. | |
| 2005/0047514 A1 | 3/2005 | Bolinth et al. | |
| 2005/0075103 A1 | 4/2005 | Hikokubo et al. | |
| 2005/0088959 A1 | 4/2005 | Kadous | |
| 2005/0094659 A1 | 5/2005 | Watson | |
| 2005/0102598 A1 | 5/2005 | Shokrollahi | |
| 2005/0105494 A1 | 5/2005 | Kim et al. | |
| 2005/0136844 A1 | 6/2005 | Giesberts et al. | |
| 2005/0210355 A1 | 9/2005 | Itoh et al. | |
| 2005/0219999 A1 | 10/2005 | Kim et al. | |
| 2005/0220047 A1 | 10/2005 | Baey et al. | |
| 2005/0255807 A1 | 11/2005 | Araki et al. | |
| 2005/0270978 A1 | 12/2005 | Haines | |
| 2005/0276266 A1 | 12/2005 | Terry | |
| 2005/0276317 A1 | 12/2005 | Jeong et al. | |
| 2005/0288062 A1 | 12/2005 | Hammerschmidt et al. | |
| 2006/0019602 A1 | 1/2006 | Ionescu et al. | |
| 2006/0056380 A1 | 3/2006 | Mitsugi et al. | |
| 2006/0087456 A1 | 4/2006 | Luby | |
| 2006/0093058 A1 | 5/2006 | Skraparlis | |
| 2006/0107165 A1 | 5/2006 | Murata et al. | |
| 2006/0235895 A1 | 10/2006 | Rodriguez et al. | |
| 2007/0041461 A1 | 2/2007 | Lu et al. | |
| 2007/0133691 A1 * | 6/2007 | Kozat | 375/240.24 |
| 2007/0173206 A1 | 7/2007 | Furukawa et al. | |
| 2007/0195894 A1 | 8/2007 | Shokrollahi et al. | |
| 2007/0201536 A1 | 8/2007 | Nicolas et al. | |
| 2007/0217432 A1 * | 9/2007 | Molisch | H04B 7/026 370/400 |
| 2007/0223620 A1 | 9/2007 | Kalhan et al. | |
| 2007/0260957 A1 | 11/2007 | Soljanin et al. | |
| 2008/0090517 A1 * | 4/2008 | Cheng | H04L 1/1825 455/39 |
| 2008/0144512 A1 | 6/2008 | Molisch et al. | |
| 2008/0144562 A1 * | 6/2008 | Draper et al. | 370/315 |
| 2008/0152010 A1 | 6/2008 | Youn | |
| 2008/0199021 A1 | 8/2008 | Park | |
| 2009/0270028 A1 * | 10/2009 | Khojastepour et al. | 455/24 |
| 2009/0304117 A1 | 12/2009 | Koslov et al. | |
| 2010/0020782 A1 | 1/2010 | Koslov et al. | |
| 2010/0067568 A1 | 3/2010 | Koslov et al. | |
| 2010/0067614 A1 | 3/2010 | Koslov et al. | |
| 2011/0200088 A1 | 8/2011 | Koslov et al. | |
| 2012/0182914 A1 | 7/2012 | Hariharan et al. | |
| 2013/0265494 A1 | 10/2013 | Mourad et al. | |
| 2013/0265960 A1 | 10/2013 | Wang et al. | |
| 2015/0138999 A1 | 5/2015 | Ayudainayagam et al. | |
| 2016/0099790 A1 | 4/2016 | Balachandran et al. | |
| 2016/0345202 A1 | 11/2016 | Bharadwaj et al. | |
| 2016/0359653 A1 | 12/2016 | Lee et al. | |
| 2017/0063498 A1 | 3/2017 | Venkatsuresh et al. | |

FOREIGN PATENT DOCUMENTS

| | | | |
|---|---|---|---|
| DE | 10059490 | 11/2000 | |
| EP | 1492263 A1 | 12/2004 | |
| EP | 1528832 | 5/2005 | |
| EP | 1542385 | 6/2005 | |
| EP | 1580917 | 9/2005 | |
| EP | 1662688 | 5/2006 | |
| GB | 2361608 | 10/2001 | |
| JP | 08088620 | 4/1996 | |
| JP | 2001-333051 | 11/2001 | |
| JP | 2002-64424 | 2/2002 | |
| JP | 2003319458 | 11/2003 | |
| JP | 2004-40314 | 2/2004 | |
| JP | 2004-343754 | 12/2004 | |
| JP | 2005-20530 | 1/2005 | |
| JP | 2005-501455 | 1/2005 | |
| JP | 2005-64947 | 3/2005 | |
| JP | 2005-167780 | 6/2005 | |
| JP | 2005-269480 | 9/2005 | |
| JP | 2005-277570 | 10/2005 | |
| JP | 2006-129277 | 5/2006 | |
| JP | 2006-157133 | 6/2006 | |
| JP | 2006-211017 | 8/2006 | |
| JP | 2006-217663 | 8/2006 | |
| JP | 2006-340113 | 12/2006 | |
| JP | 2007510363 | 4/2007 | |
| JP | 2008503183 | 1/2008 | |
| JP | 2009-501483 | 1/2009 | |
| WO | WO-9813940 | 4/1998 | |
| WO | WO0018056 | 3/2000 | |
| WO | 03/019376 A1 | 3/2003 | |
| WO | WO03019817 | 3/2003 | |
| WO | WO2004034589 | 4/2004 | |
| WO | 2004/075023 A2 | 9/2004 | |
| WO | WO2005036753 | 4/2005 | |
| WO | WO-2005046125 | 5/2005 | |
| WO | 2005/125109 A2 | 12/2005 | |
| WO | 2006/013459 A1 | 2/2006 | |
| WO | WO 2007111563 A2 * | 10/2007 | ........... H04B 7/0417 |
| WO | 2008/073093 A1 | 6/2008 | |
| WO | 2008/073102 A1 | 6/2008 | |
| WO | 2008/073104 A1 | 6/2008 | |
| WO | 2008073144 A1 | 6/2008 | |
| WO | WO2008073102 | 6/2008 | |
| WO | WO2008073103 | 6/2008 | |
| WO | WO2008073104 | 6/2008 | |
| WO | WO2008073144 | 6/2008 | |

OTHER PUBLICATIONS

Castura et al., "Rateless Coding Over Fading Channels", IEEE Communications Letters, vol. 10, No. 1, Jan. 2006.

Caire et al., "Universal Variable-Length Data Compression of Binary Sources Using Fountain Codes", ITW 2004, San Antonio, TX, Oct. 24-29, 2004, IEEE, pp. 123-128.

Chung et al., "Reliable Wireless Multicast Using Fast Low-Density Erasure Codes", The 57th IEEE Semiannual Vehicular Technology Conference, 2003. VTC 2003, Apr. 22-25, 2003, vol. 2, pp. 1218-1222.

Dekorsy et al., "Low-Rate Channel Coding With Complex-Valued Block Codes", IEEE Transactions on Communications, vol. 51, No. 5, May 2003, pp. 800-809.

(56) References Cited

OTHER PUBLICATIONS

Delsarte et al., "Algebraic Constructions of Shannon Codes for Regular Channels", IEEE Transactions on Information Theory, vol. IT-28, No. 4, Jul. 1982, pp. 593-599.
Eckford et al., "Rateless Slepian-Wolf Codes," Conference Record of the Thirty-Ninth Asilomar Conference on Signals, Systems and Computers, Oct. 28-Nov. 1, 2005, pp. 1757-1761.
Erez et al., "Rateless Space-Time Coding," Proceedings 2005 Int'l. Symposium Information Theory, ISIT 2005, in Adelaide, Australia, Sep. 4-9, 2005, published in Piscataway, NJ, USA, pp. 1937-1941, XP010845889.
Jenkac et al., "The turbo-fountain," Special Issue on Next Generation Wireless and Mobile Communications, European Transactions on Telecommunications, May 23, 2006, pp. 337-349, published online in Wiley InterScience, Chichester, GB, vol. 17, No. 3.
Kamikura et al., "Video Coding Using Global Motion and Brightness-Variation Compensation with Complexity Reduction," Article in Japanese, only English abstract provided, Apparent Publication Date: Oct. 16, 2002.
Ko et al., "Serial Concatenation Schemes for Space-Time and Recursive Convolutional Codes," Proceedings of the 57th IEEE Semi-Annual Vehicular Technology Conference, Jeju, Korea, Apr. 22-25, 2003, vol. 4 of 4, pp. 736-740, XP010862224.
Lin et al, "Improved Space-Time Codes Using Serial Concatenation," IEEE Communications Letters, IEEE Service Center, Piscataway, NJ, US, vol. 4, No. 7, Jul. 2000, pp. 221-223, XP000958655.
Liu, "A Lossless Layered Coding Strategy for MIMO Systems", Proceedings of Int'l. Symposium on Information Theory, ISIT 2005, Sep. 4-9, 2005, pp. 1947-1951.
Luo et al., "On Rate Control of Wireless Multicasting," IEIC Technical Report (Institute of Electronics, Information and Communication Engineers, May 18, 2006, vol. 106, No. 60, pp. 7-10.
Ma et al., "Fountain Codes and Applications to Reliable Wireless Broadcast System," Proceedings of 2006 IEEE Information Theory Workshop (ITW'06), Oct. 22-26, 2006, in Chengdu, China, published IEEE, Piscataway, NJ, USA, pp. 66-70, XP002448345.
Maymounkov et al., "Rateless Codes and Big Downloads," Int'l. Workshop on Peer-to-Peer Systems, PTPS 2003, No. 2, Berkeley, CA, ETATS-UNIS (21 Feb. 21, 2003), vol. 2735, pp. 247-255.
Palanki et al., "Rateless Codes on Noisy Channels," Mitsubishi Electric Research Laboratories, TR-2003-124, Apr. 2004, pp. 1-12.
Richardson et al., "The Capacity of Low-Density Parity-Check Codes Under Message-Passing Decoding," IEEE Transactions on Information Theory, vol. 57, No. 2, Feb. 2001, pp. 599-618.
Wang et al., "Combined Speech and Channel Coding for Wireless Communications," Wireless Personal Communications: An Int'l. Journal, vol. 17, Issue 1, Apr. 2001, pp. 21-43, Kluwer Academic Publishers, Netherlands.
Wiesel et al., "Turbo Equalization and Demodulation of Multicode Space Time Codes," 2003 IEEE International Conference on Communications, Anchorage, AK, May 11-15, 2003, New York, NY, vol. 1 of 5, pp. 2296-2300, XP010642856.
Wikipedia, "Mutual Information," The free encyclopedia, http://en.wikipedia.org/wiki/Mutual_information, Nov. 29, 2006, pp. 1-6.
Wikipedia, "Online Codes," The free encyclopedia, http://en.wikipedia.org/wiki/Online_codes, Nov. 29, 2006, pp. 1-3.
Zhang et al., "Impact of Feedback Channel on Measured MIMO Systems and Its Lower Bound," Chinese Journal of Electronics, vol. 14, No. 2, Apr. 2005.
International Search Report, dated Aug. 31, 2007.
Jeff Castura, et al., "Rateless Coding for Wireless Relay Channels", pp. 2-6.
Shan et al., "Two-Stage FEC Scheme for Scalable Video Transmission over Wireless Networks," Proceedings of the SPIE, vol. 6015, pp. 173-186, Oct. 2005.
Shokrollahi, "Raptor Codes", IEEE Transactions on Information Theory, vol. 52, No. 6, Jun. 2006. pages 2551-2567.

* cited by examiner ced through different transmit
RATELESS CODES DECODING METHOD FOR COMMUNICATIONS SYSTEMS This application claims the benefit, under 35 U.S.C. §365 of International Application PCT/US2006/47911, filed on Dec. 14, 2006, which was published in accordance with PCT Article 21(2) on Jun. 19, 2008, in English.

BACKGROUND

Field of the Technology

The present principles relate to communication systems.

Description of Related Art

Layered coding systems are commonly known and used throughout the communication industry. An example of such layered coding system is a MIMO (Multiple Input, Multiple Output) architecture. These multi-antenna systems have increased spectral efficiency through the use of spatial multiplexing.

A MIMO system is a system in which multiple transmit antennas and multiple receive antennas are employed. MIMO systems can generally achieve higher capacity in a rich-scattering environment compared to SISO (single input single output) systems. Different approaches can be used to achieve the MIMO capacity: a space-time code can be applied to multiple transmit antennas over multiple channel uses; a layered structure can also be applied where only a one-dimensional code is applied to each layer. Examples of layered structures are V-BLAST and D-BLAST structures proposed by Bell Labs. In V-BLAST, independently encoded data streams are sent through different transmit antennas. Hence, a layer represents one antenna in V-BLAST. In D-BLAST, the data-stream/antenna association is periodically cycled.

In general, a layered architecture means any interleaving method such that, at any time, different antennas belong to different layers and each antenna index belongs to one and only one layer at any time. A layer is the indexes of the antenna as a function of time. For purpose of illustration, a layered structure is shown in FIG. 1, where layer 1 from time index 1 to 7 is represented by antenna index 3, 2, 1, 3, 2, 1, 3.

SUMMARY

In accordance with a general aspect of the present principles, initial encoded data that has been encoded with a rateless code is received. A quality metric is determined for a communication medium on which the initial encoded data has been received. A modulation scheme used in sending the initial encoded data on the communication medium is identified. Based on the identified modulation scheme and the determined quality metric, an estimate is determined of an amount of mutual information being received per unit of received encoded data. An amount of mutual information being received is determined, based on the determined estimate.

The details of one or more implementations are set forth in the accompanying drawings and the description below. Other features will be apparent from the description and drawings, and from the claims.

BRIEF DESCRIPTION OF THE DRAWINGS

In the drawings wherein like reference numerals denote similar components throughout the views.

DETAILED DESCRIPTION

In a layered MIMO system, such as, for example, V-BLAST or D-BLAST architectures, rateless codes can be used across sub-channels to provide error correction. In such a system, codewords can be decoded when enough information has been received. In order to determine when enough information has been received, the channel conditions, for example, the instantaneous signal-to-noise ratio (SNR), are monitored. The mutual information is a function of the SNR. By averaging the mutual information over time, the maximum transmission rate can be determined. One problem is that, under poor conditions, the time required to accumulate enough mutual information in order to decode a codeword may be long, and systems having real-time constraints, for example, streaming video, will suffer undue delay and error.

According to an implementation of the present principles, the sending of subsequent codewords encoded with a rateless code can be based on timing, or alternatively, can use the SNR information and correspondingly stored look up tables to obtain capacity values of the communication layer to avoid over-estimation of the received mutual information.

Figure 1:
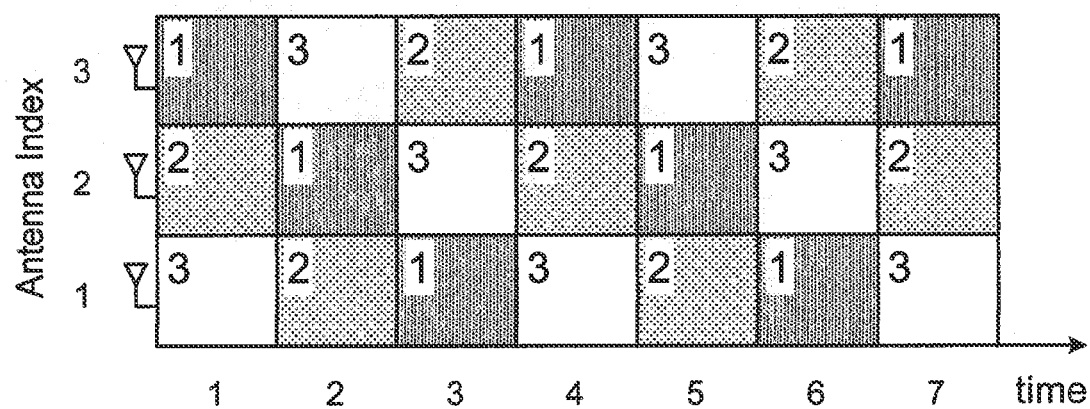
FIG. 1 is diagram of a layered communication structure showing the indexes of an antenna as a function of time.
Figure 2:
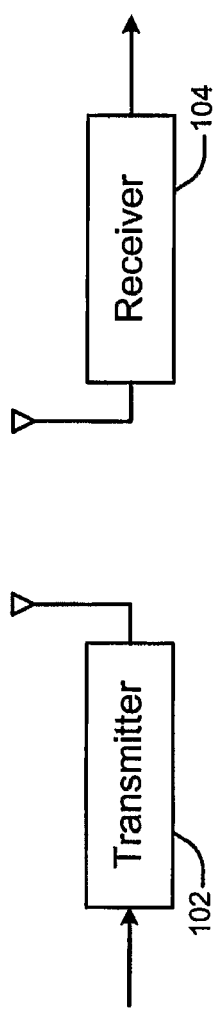
FIG. 2 is a block diagram of a communication system according to an aspect of the present principles.
Figure 3:
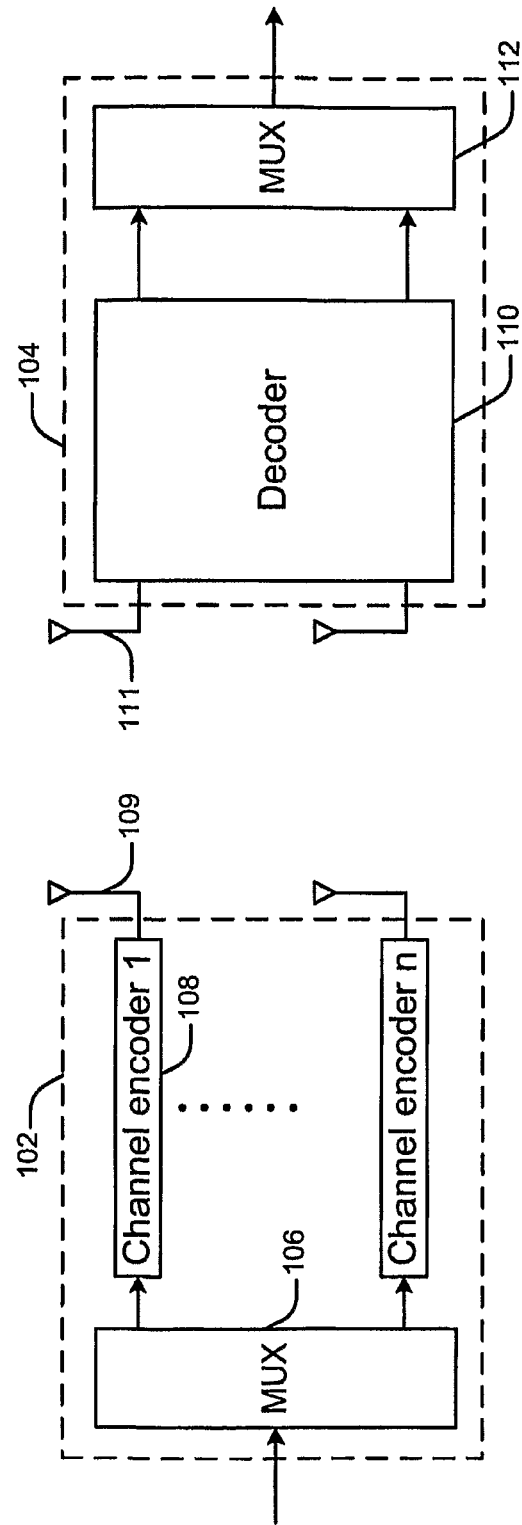
FIG. 3 is a more detailed block diagram of an exemplary MIMO communication system into which the present principles can be integrated.

FIGS. 2 and 3 show a transmitter 102 and a receiver 104 of a communication system implementing various concepts of the present principles. By way of example, FIG. 3 shows a V-BLAST communication system showing the transmitter (i.e., encoder) having an input multiplexer 106 and a plurality of channel encoders 108 each having its own antenna 109. The receiver 104 includes a decoder 110 and an output multiplexer 112. Those of ordinary skill in the art will recognize that the communication system of FIGS. 2 and 3 is disclosed herein for exemplary purposes only and the present principles can be applied to any layered communication system utilizing rateless codes (e.g., all MIMO systems). For example, the transmitter and receiver can each be replaced with a transceiver depending on the particular application. Those of skill in the art will recognize that the modulators contained within the transmitter 102 and the demodulators contained within the receiver 104 are not shown, for simplification purposes, in FIG. 3.

Figure 4:
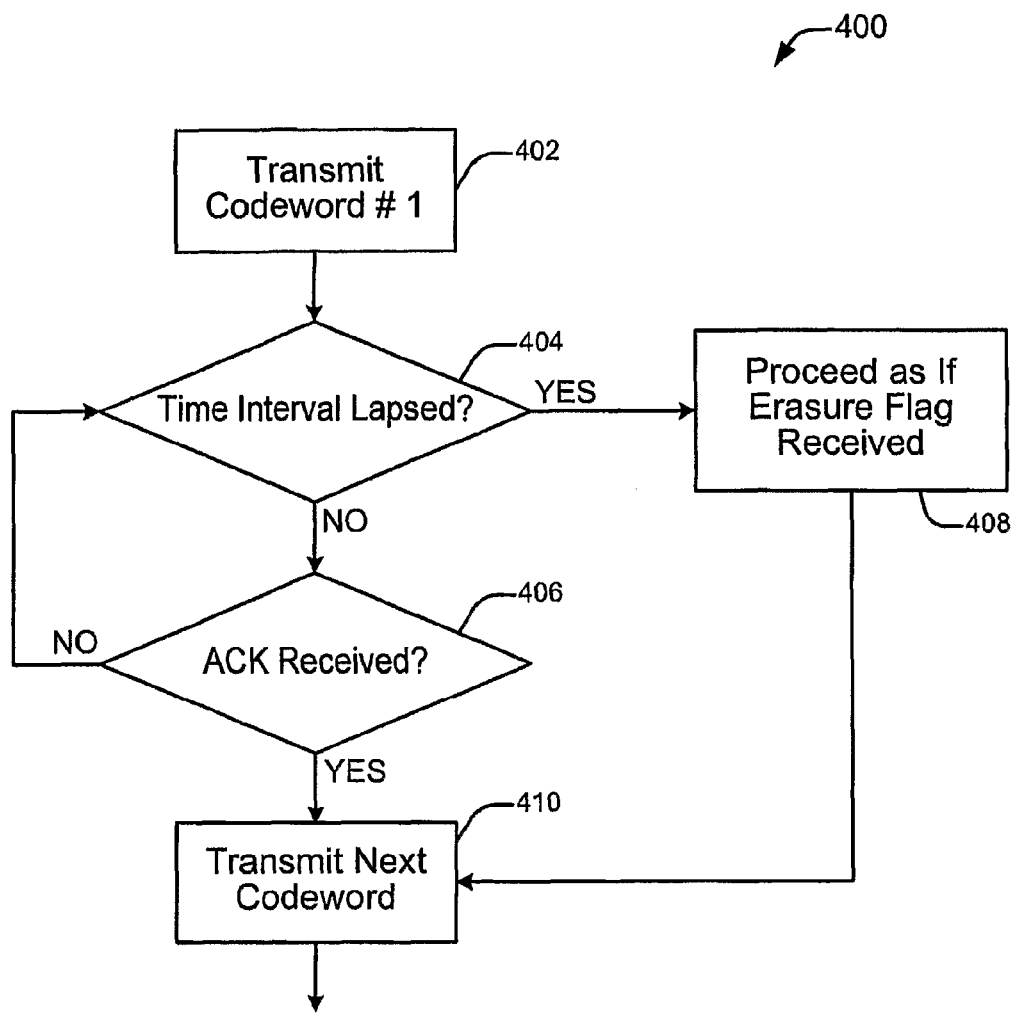
FIG. 4 is a flow diagram of a method according to an aspect of the present principles.

Referring to FIG. 4, and in accordance with one implementation of some of the present principles, a codeword is encoded with a rateless code and transmitted 402. Upon transmission, or at a time substantially equal to the transmission, a time interval is monitored 404. The time interval is generally predetermined and has a length that enables the transmitter to assume that the transmitted codeword has been successfully received by a receiver. Those of skill in the art will recognize that the time interval can be established and monitored in many different ways without departing from the spirit of the present principles. For example, the time interval can be established and monitored through the use of setting interrupts using a processor or other computing medium, using clocks with timing flags or other indicators, and possibly maintaining a separate timer for each predetermined time interval.

During the time interval, the transmitter determines whether an indication signal in the form of an acknowledgement signal (ACK) has been received (406). When the indication signal ACK has been received during the time interval, the next codeword is transmitted 410.

If the indication signal ACK is not received during the time interval, the system proceeds as if an erasure flag has been received 408 and forces the subsequent transmission of the next codeword 410. Although an erasure flag may not necessarily be received by the transmitter, by forcing the transmitter to comply with the time intervals for codeword transmission, the real time constraints or requirements of the system can still be met.

Figure 5A:
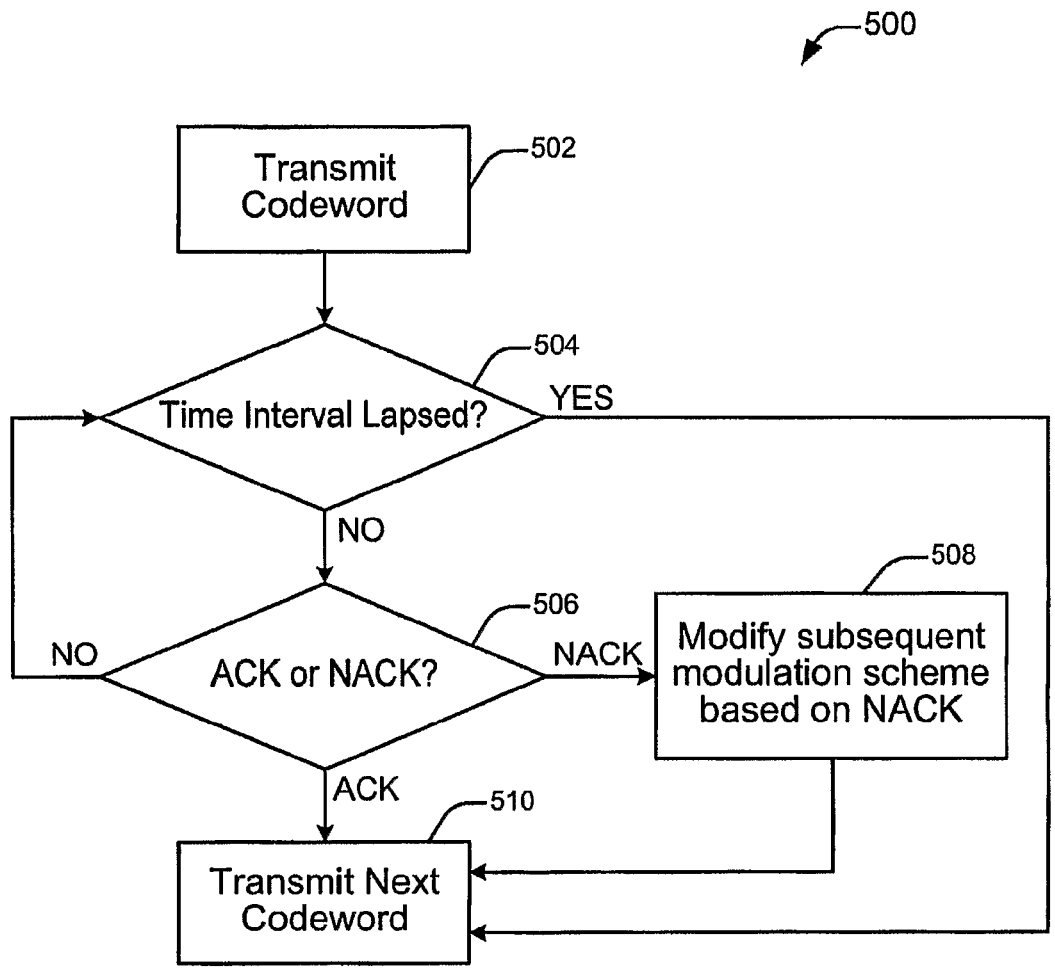
FIG. 5a is flow diagram of a method according to another aspect of the present principles.

FIG. 5a shows another implementation of the present principles where the erasure flag is embodied in the form of a negative acknowledgment NACK. Thus, when the time interval has expired 504, the next codeword is transmitted 510 regardless of whether an indication signal has been received. If during the time interval an indication signal is received, a determination is made 506 as to whether the indication is a positive acknowledgement ACK or a negative acknowledgement NACK.

According to various implementations, the positive acknowledgement ACK can be an indication that the transmitted codeword was received successfully, or an indication of successful receipt and successful decoding. The negative acknowledgement NACK can be an indication that the transmitted codeword may be unreliable or unable to be fully decoded. When a NACK is identified, the transmitter modifies a subsequent modulation scheme 508 used to transmit the next codeword 510. In one implementation, the NACK functions to notify the transmitter that the current modulation scheme is not working on the decoder side and the transmitter responds by modifying the modulation scheme for subsequent transmissions.

Figure 5B:
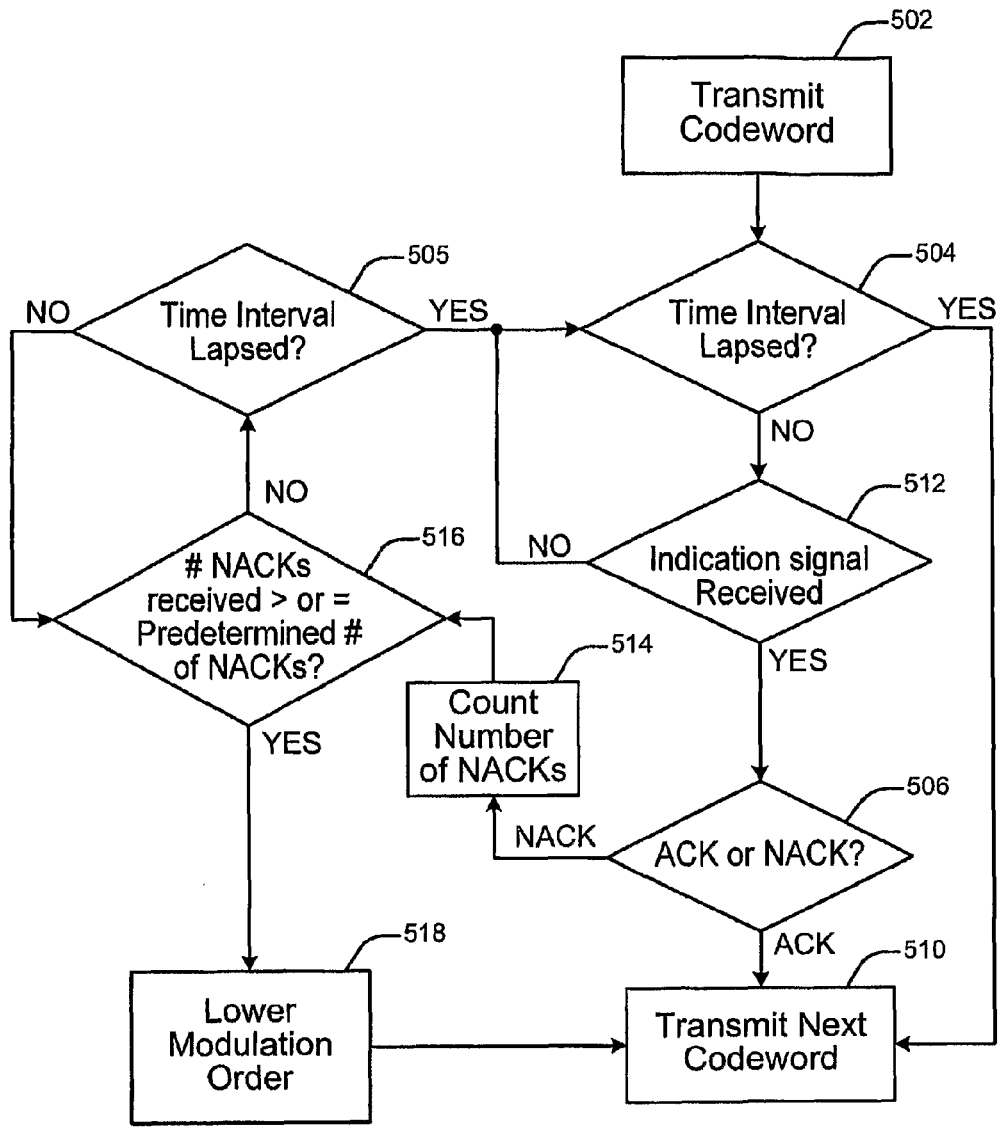
FIG. 5b is flow diagram of a method according to another aspect of the present principles.

In accordance with another implementation shown in FIG. 5b, the transmitter can monitor or count the number of NACKs (514) received for a predetermined period of time 505. This predetermined period of time 505 is generally longer than the predetermined time period 504 and is selected to confirm whether the channel is really bad (in the case of NACKS), or really good (in the case of ACKs—See FIG. 5c). If the number of received NACKs is greater than or equal to the predetermined number of NACKs received 516 during the predetermined time period 505, the transmitter can respond by lowering the order of modulation 518 (e.g., from 16-QAM to QPSK) and transmit the next codeword accordingly, without requiring any further information from the receiver (for example, without requiring a modulation modification index, etc.)

Figure 5C:
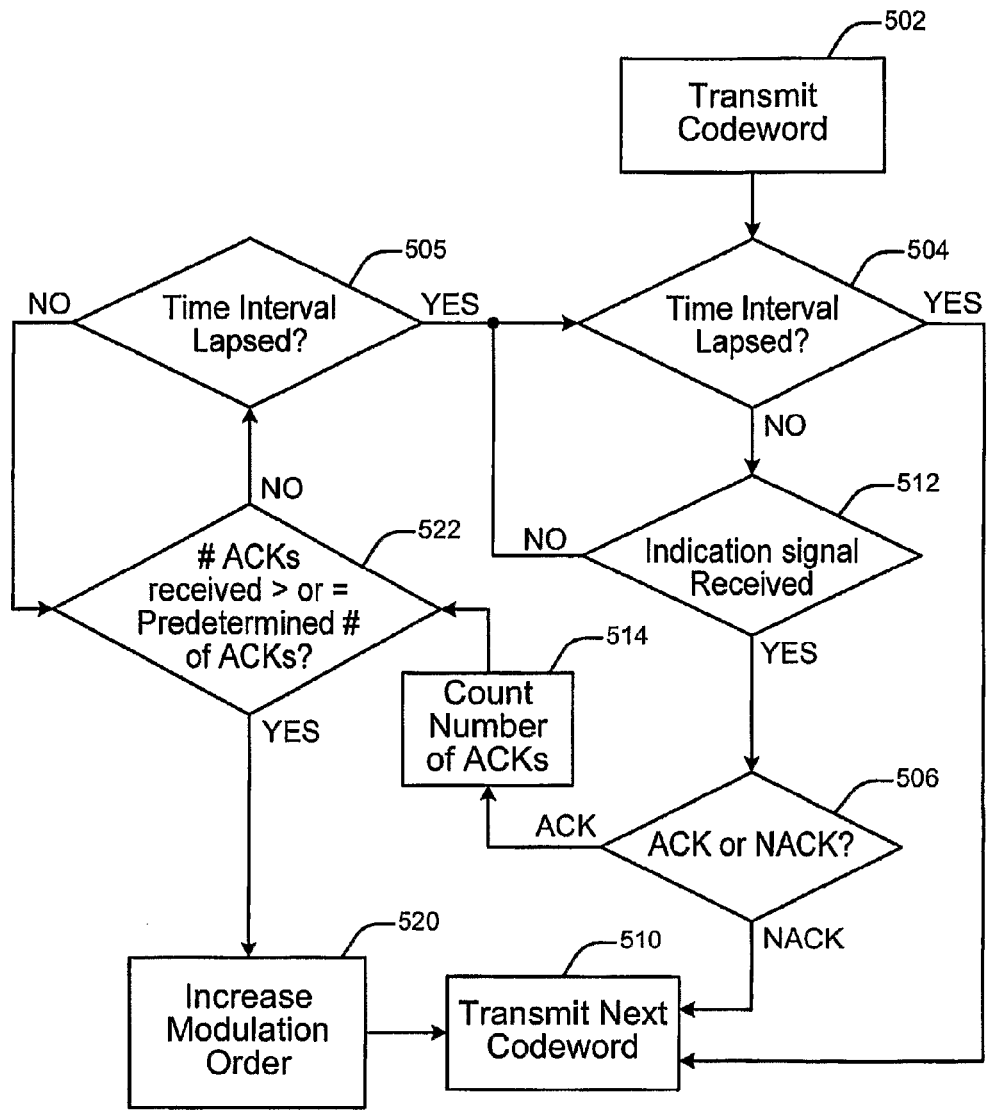

Conversely, as shown in FIG. 5*c* when the number of received ACKs is greater than or equal to the predetermined number of ACKs received 522 during the predetermined time period 505, the transmitter responds by increasing the order of modulation 520 (e.g., from QPSK to 16-QAM) prior to the transmission of the next codeword 510. Implementations of FIGS. 5*b* and 5*c* also may continue to transmit additional codewords while accumulating and counting ACKs and/or NACKs.

Figure 6:
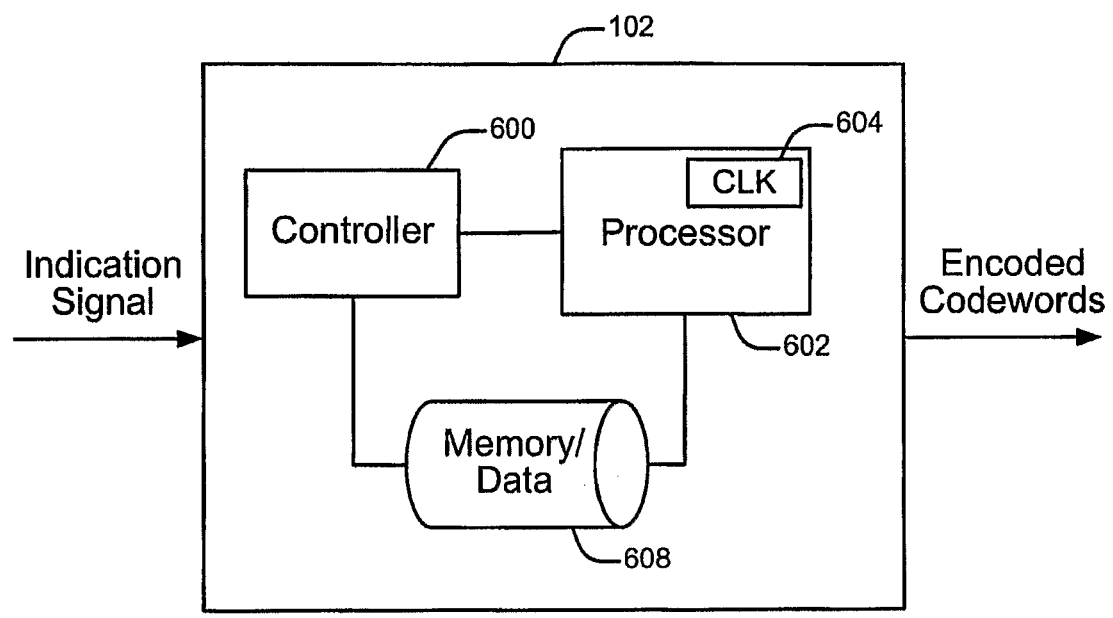
FIG. 6 is block diagram of an apparatus according to an aspect of the present principles.

FIG. 6 shows a diagram of a transmitter 102 according to one implementation of the present principles. The transmitter 102 includes a controller 600, a processor 602 and at least one memory/data storage device 608. Processor 602 includes an onboard clock or timer 604 that, as described above, can be used in many different ways to provide the timer functions of various present principles. According to various implementations, controller 600 can be an application specific integrated circuit (ASIC), a processor programmed to function according to one or more of the present principles, or any other combination of logic or integrated circuit designs necessary to function according to one or more of the present principles. The memory 608 can be embodied in many different forms without departing from the spirit of the present principles. For example, memory 608 can be a ROM, RAM, removable disk media, hard drive, FLASH memory, or any other suitable storage device.

Figure 7:
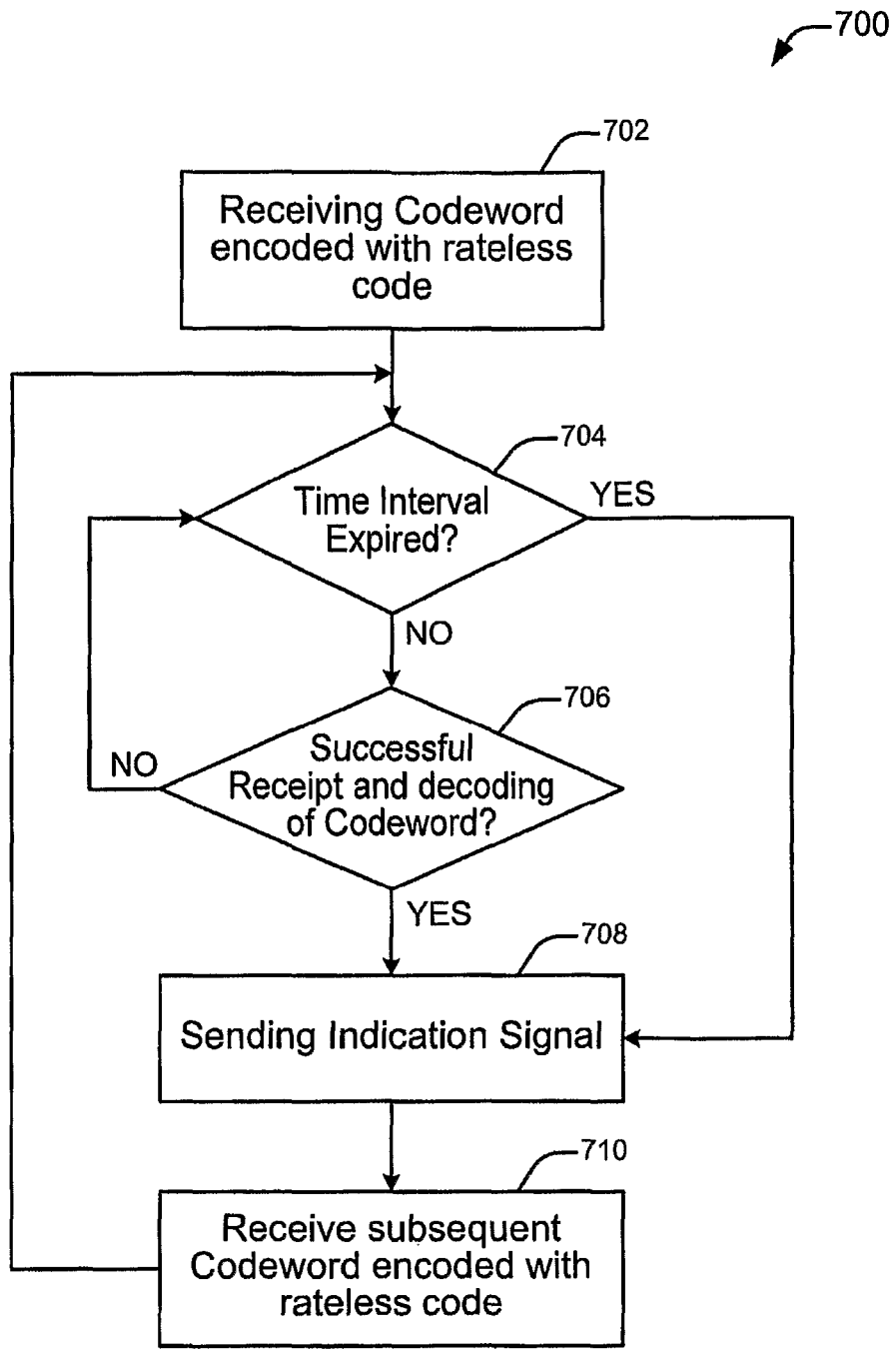
FIG. 7 is a flow diagram of a method according to another aspect of the present principles.

FIG. 7 shows the flow diagram of a method 700 for receiving codewords encoded with a rateless code. As indicated a codeword encoded with a rateless code is received 702. The operation of receiving the rateless encoded codeword 702 is an ongoing operation. During receipt, a time interval is monitored 704 to determine if the time interval has expired. Before the expiration of the time interval, it is determined (repeatedly, if needed) whether the codeword has been received and decoded successfully 706. If so, an indication signal is sent 708 providing a positive indication that the codeword has been successfully received and decoded, and a subsequent codeword is received.

When the time interval at step 704 expires and the successful receipt and decoding of the codeword is not confirmed (step 706), the receiver forces the sending of the indication signal 708 to enable the receipt of the subsequent codeword 710. As described above, the indication signal in this instance may include an erasure flag or have the same embodied in a negative acknowledgement (NACK) that is used to inform the source of the received data to modify the modulation scheme used for subsequent transmitting.

In accordance with one implementation, the indication signal sent 708, can include a modulation modification index or other modulation scheme modification instruction to the source of the encoded codewords. This is particularly applicable when the encoded codeword is not successfully received and/or cannot be successfully decoded (e.g., when the NACK signal is generated and returned to the source of the received data). As mentioned above, the modulation modification index or other modulation scheme modification instruction can be a positive increase in the modulation order when successful receipt and/or decoding is confirmed multiple times within a predetermined time interval.

Figure 8:
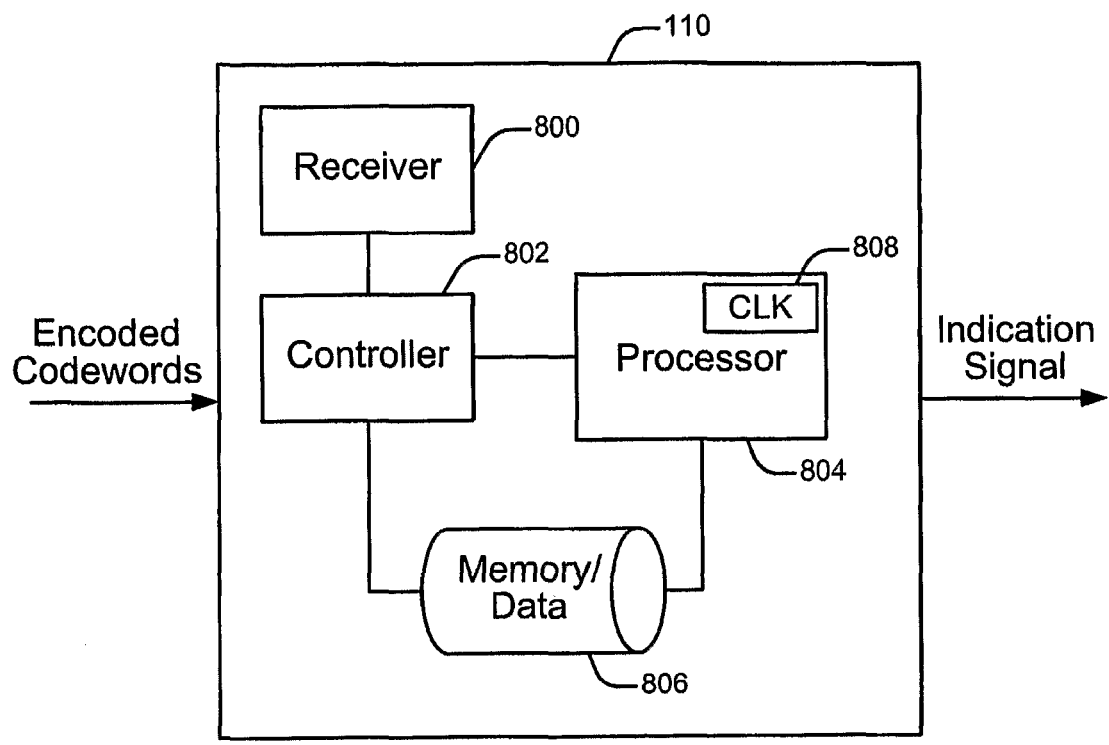
FIG. 8 is block diagram of an apparatus according to a further aspect of the present principles.

FIG. 8 shows a block diagram of the decoder 110 and some of the constituent parts of the decoder 110. The decoder 110 includes a receiver 800, a controller 802, a processor 804, at least one form of memory/data storage 806, and a clock 808. As described above with reference to FIG. 7, the decoder 110 receives the encoded codewords and provides an indication signal to the source of the encoded codewords in response to either a positive or negative receipt condition. The positive receipt condition, in one implementation, includes successful receipt of the encoded codeword, and in another implementation, includes both successful receipt and decoding of the received encoded codeword. The negative receipt condition, in one implementation, indicates that the data received is considered unreliable and may not be decodable, and in another implementation the negative receipt condition indicates that the data received is identified as not decodable.

As mentioned above, it is possible that during communication in a layered MIMO system, the computed mutual information (using an unconstrained channel capacity formula) may be much higher than the actual mutual information obtained in the receiver, especially when common modulation schemes such as, for example QPSK or 16-QAM are used in the system. This is an over-estimation of the mutual information which has an adverse effect on subsequent transmissions.

In order to overcome this problem and avoid over-estimation of the mutual information acquired in the receiver the actual capacity formula for the modulation is used in each layer. For example, when the SNR=5 db, the capacity for QPSK modulation is 1.7 bits/symbol. In the event there is no closed form capacity formula (for example, there is no close-form capacity formula for 16-QAM modulation) or the capacity computation is complicated (for example, would take too much processing time), a look-up table (LUT) can be used to obtain the received mutual information based on a determined quality metric for the layer/channel in the communication system and the type of modulation being used. In accordance with one implementation, the quality metric is the signal-to-noise ratio (SNR) in the layer. Furthermore, look-up tables (LUTs) can also be used to obtain the optimum modulation format supported by the communication channels based on the determined quality metric for the layer/channel in the communication system.

Figure 9:
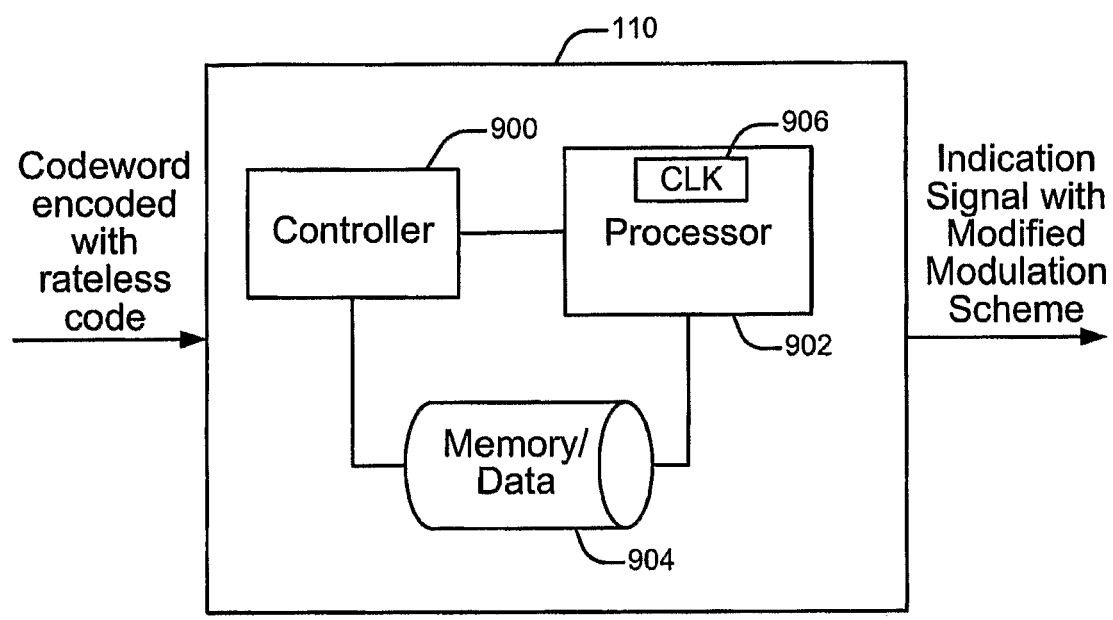
FIG. 9 is a block diagram of an apparatus according to yet a further aspect of the present principles.
Figure 10:
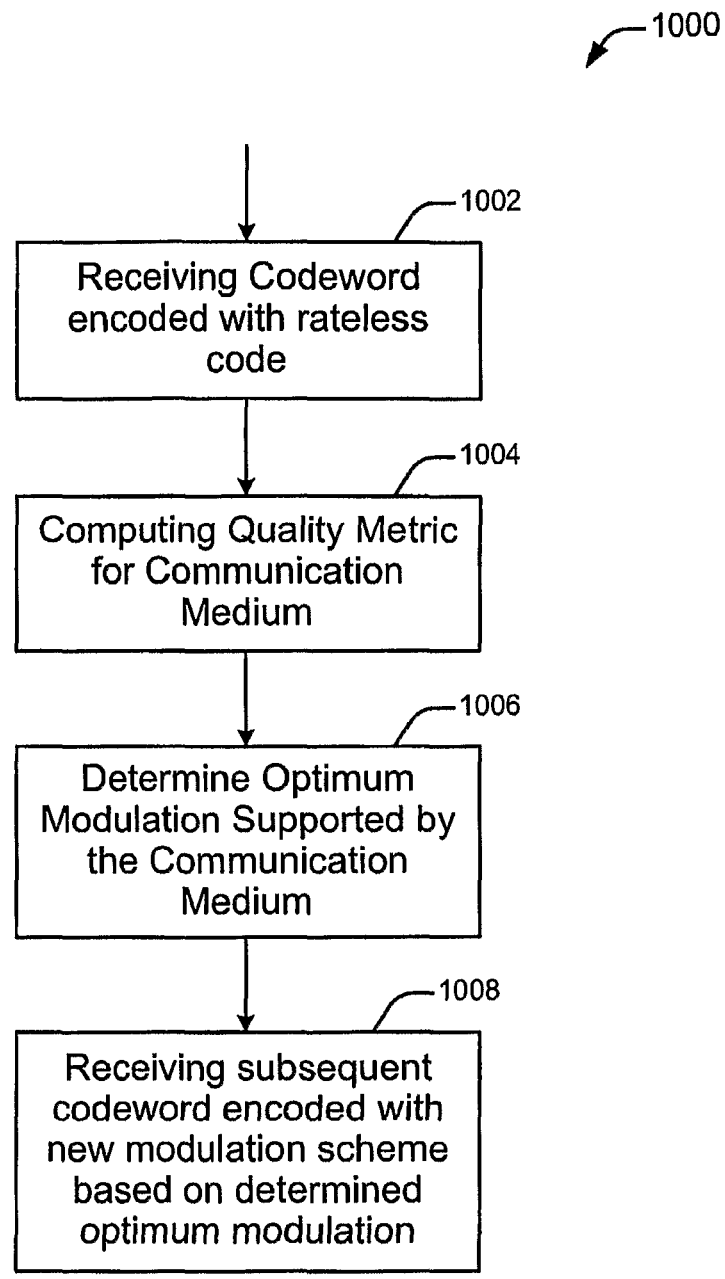
FIG. 10 is a flow diagram of a method according to yet a further aspect of the present principles.

Referring to FIGS. 9 and 10, there is shown the decoder 110 according to a further implementation of the present principles. The controller 900 of the decoder is configured to receive codewords encoded with a rateless code (1002). In a rateless code, the codewords may be defined as having an infinite length, although only a finite length is transmitted or received. Throughout this application, the term codeword is frequently used to refer to the portion of an infinite length "codeword" that is actually transmitted or received. The processor 902 is configured to compute a quality metric of the communication medium on which the codewords are transmitted. The memory 904 stores look-up table (LUT) data that can be used in determining the optimum modulation format supported by the channel. The type of LUT data would include various LUTs for each of the respective modulation schemes known to be used in the particular communication system. Some examples of such modulation schemes include, but are not limited to, BPSK, QPSK, and 16-QAM.

The computed quality metric is used to determine, using for example the processor 902, the optimum modulation format supported by the communication medium 1006. Once determined, the controller of the decoder is configured to receive subsequent codewords based on the modified modulation scheme. The modified modulation scheme was derived from the determined optimum modulation format capable of being supported by, and used for sending data over, the communication medium 1008.

Figure 11:
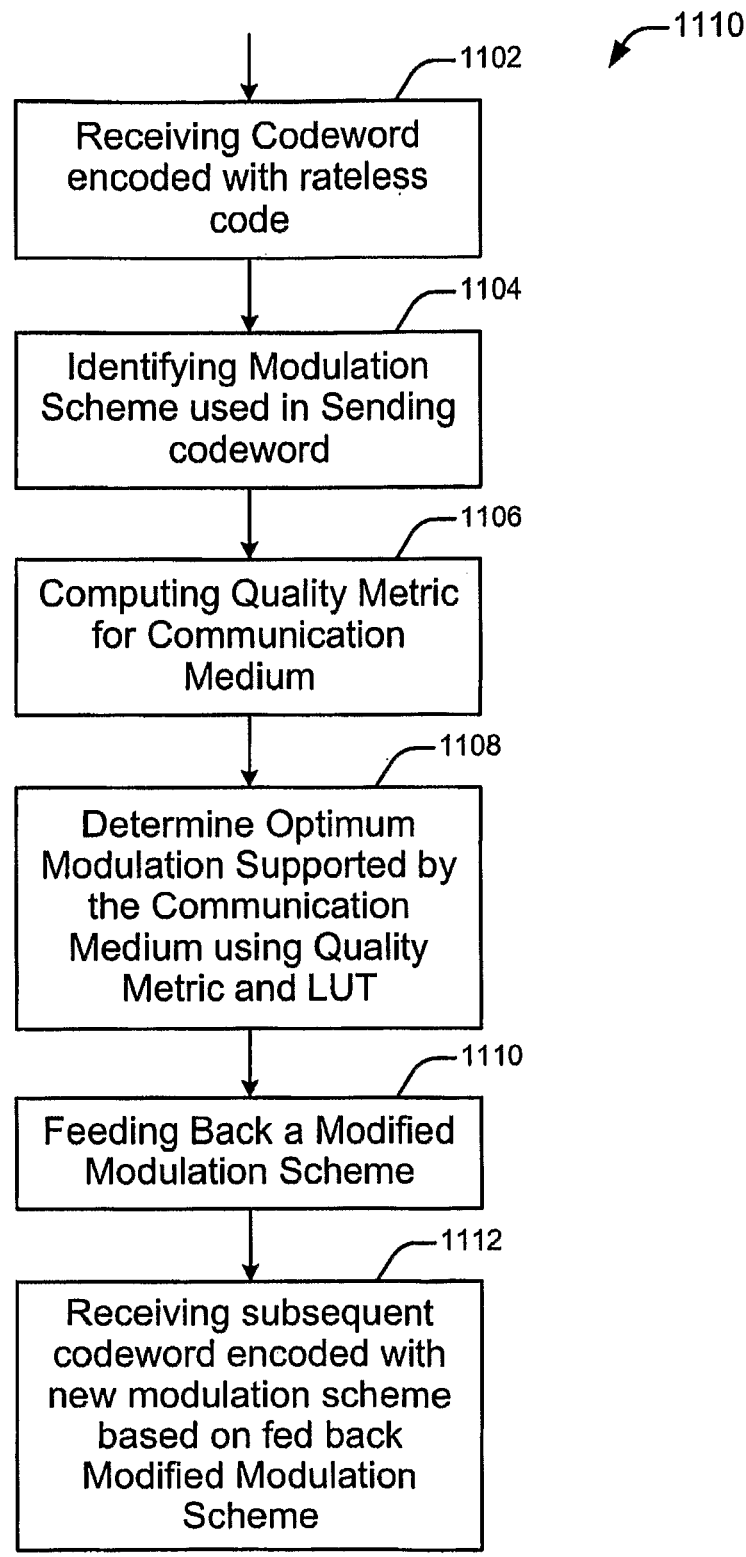
FIG. 11 is a flow diagram of a method according to another aspect of the present principles.

In accordance with a further implementation 1100, shown in FIG. 11, after receiving the codeword 1102, the decoder identifies the modulation scheme 1104 being used by the source of received data. A quality metric for the communication channel is then computed 1106, using for example a processor. The computed quality metric (for example, the SNR of the channel or layer) and the known modulation scheme are used to access memory 904 and obtain a LUT value corresponding to the known modulation scheme. The optimum modulation format supported by the communication medium is determined 1108. The optimum modulation format may be determined, for example, by a processor determining which modulation format's LUT provides the highest expected capacity at the computed quality metric. If the determined optimum modulation format is different from the current modulation scheme (or perhaps, having a difference that is large enough to justify a switch), the optimum modulation scheme is identified as a new modulation scheme. A "hysteresis" value can be used to avoid a ping-pong switching effect. The new modulation scheme is fed back 1110 to a source of the transmitted data. The source is presumed to send subsequent codewords using the fed-back modified modulation scheme. Subsequent encoded codewords are received 1112 using the fed-back modified modulation scheme. Of course, the "optimum" format need not be globally optimum, and many implementations determine a format that improves (but need not optimize) performance.

Figure 11A:
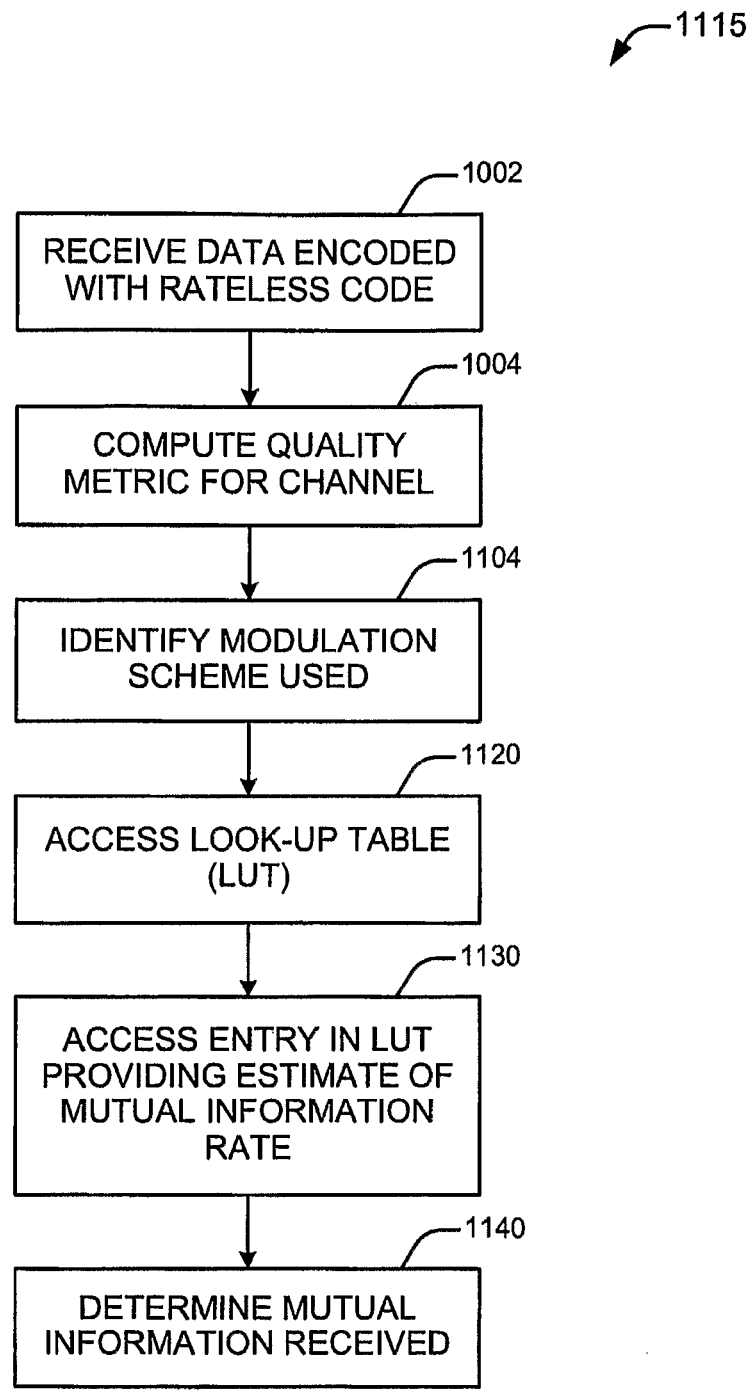
FIG. 11a is a flow diagram of a method according to another aspect of the present principles.

Referring to FIG. 11*a*, a method 1115 is shown. In various implementations, LUTs are also used to determine the amount of mutual information that is being received. The method 1115 is an example of such an implementation. The method 1115 includes receiving data encoded with a rateless code 1002, determining a quality metric for the channel (for example, SNR) 1004. The quality metric may be determined by, for example, computing the metric, receiving the metric from another device, or accessing the metric from storage. A modulation scheme used in transmitting the received encoded data is identified 1104.

The method 1115 further includes determining an estimate, based on the identified modulation scheme/format and the determined quality metric, an estimate of an amount of mutual information being received per unit of received encoded data. Determining the estimate may be performed in various ways, such as, by example using a closed-form capacity equation. The method 1115 illustrates another implementation that may provide increased speed, and that will also accommodate capacity equations that are not closed-form.

The method 1115 further includes accessing a particular LUT based on the identified modulation scheme/format and the determined quality metric 1120, and accessing an entry in the particular LUT that provides an estimate of an amount of mutual information being received per unit of received encoded data 1130. The method 1115 further includes determining an amount of mutual information received based on the accessed entry 1140. In one implementation, the LUT is a one-dimensional table (for example, a list) including mutual information for a given modulation format, with each entry corresponding to a different SNR. In another implementation, the LUT is a two-dimensional table (for example, a matrix), with rows corresponding to modulation format and columns corresponding to SNR, and entries corresponding to mutual information indicators for a particular row (modulation format) and column (SNR). The mutual information indicators (the entries in the LUTs) may be determined, for example, based on a capacity formula corresponding to the identified modulation scheme and SNR. This use of LUTs may be performed without using other concepts and aspects described in this application, or may be used in conjunction with one or more other concepts and aspects.

In MIMO and other communication systems, although the capacity calculation is performed to compute the received mutual information, unfortunately, it is typically only an approximation and accurate in the limit over time. Thus, even when the overall received mutual information is declared to be sufficient for decoding by the receiver, it may, in fact, still be insufficient to decode a codeword.

According to one aspect of the present principles, this insufficiency is addressed by enabling the accumulation of additional mutual information in the receiver beyond that which is considered an ordinary amount to enable accurate decoding of the received codeword. The accumulation of additional mutual information provides a higher probability of successful decoding.

Figure 12A:
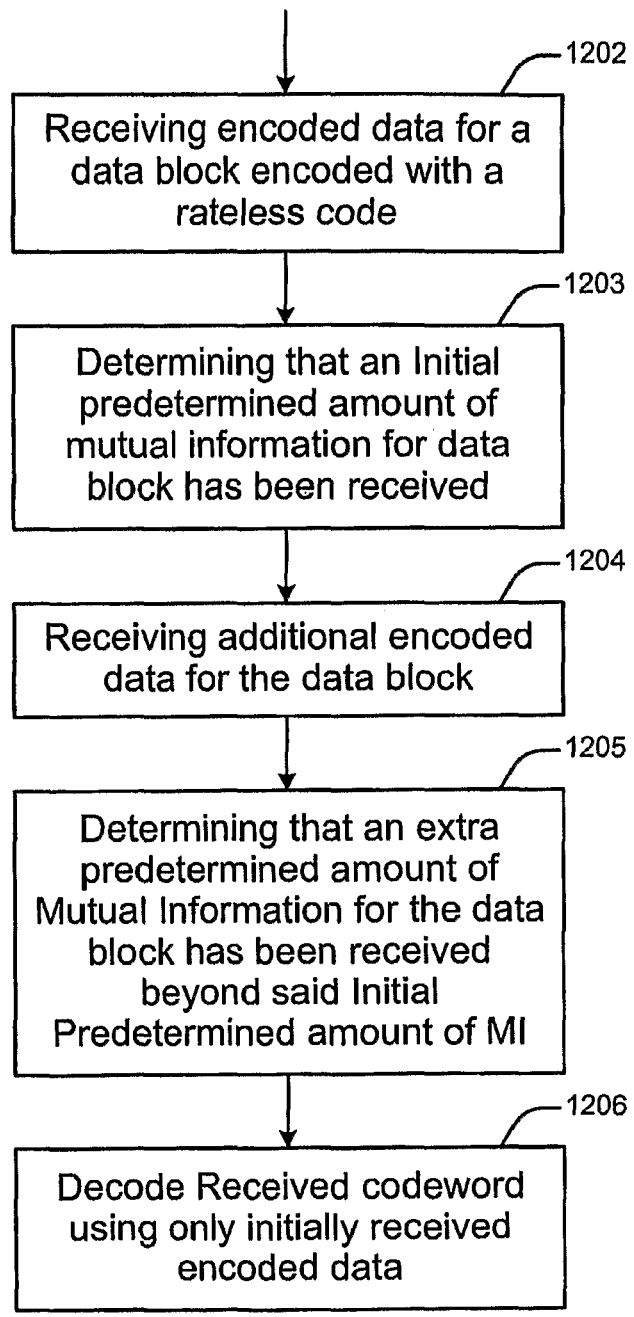
FIG. 12a is flow diagram of a method according to one aspect of the present principles.
Figure 12B:
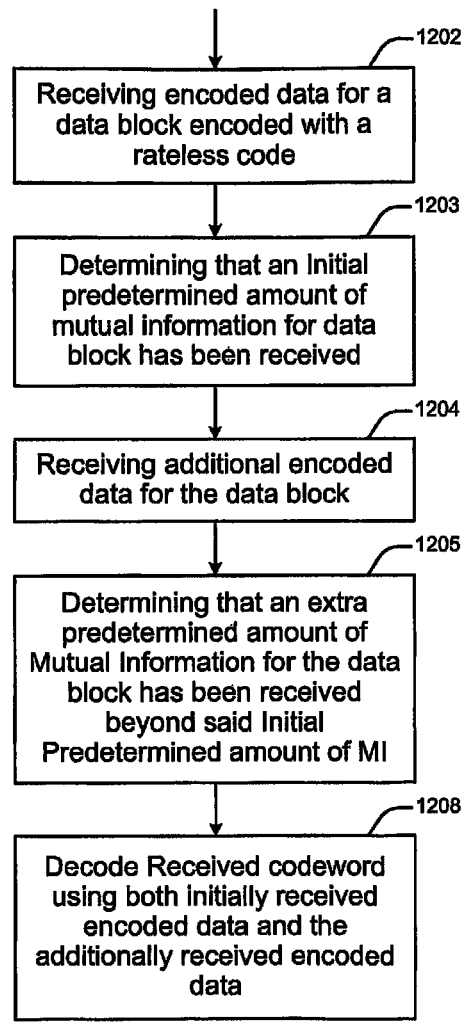
FIG. 12b is a flow diagram of a method according to another aspect of the present principles.

Thus, referring to FIGS. 12*a* and 12*b*, there is shown a method 1200 according to one implementation of the present principles. Initially, data for a data block encoded with a rateless code is received 1202. A determination is then made that an initial predetermined amount of mutual information (MI) for the data block has been received 1203 by a receiver. This "initial predetermined amount" is an amount that is believed to be sufficient to enable the receiver to successfully decode a received codeword. Those of skill in the art will recognize that this "initial predetermined amount" may be different for each communication system, and takes into consideration any known communication medium variables such as noise, etc.

Once the "initial predetermined amount" of mutual information has been received, additional encoded data for the data block is received 1204, and another determination is made as to whether an extra predetermined amount of mutual information for the data block has been received beyond the initial predetermined amount 1205. One the additional amount or "extra predetermined amount" of mutual information has been accumulated, the receiver decodes the received codeword (1206) and then continues to receive MI and encoded codewords for the next received transmission. The decoding of the codeword 1206, in this implementation is performed using only the initial predetermined amount of encoded data. As shown in FIG. 12*b*, in another implementation, the decoding 1206 can be performed using both the initially received encoded data and the additionally received encoded data 1208. By using the extra accumulated MI associated with the extra/additional encoded data for the data block (1204), the probability of successful decoding by the receiver is increased.

Those of skill in the art will recognize that the actual amount of the "extra predetermined amount" can vary from communication system to communication system without departing from the spirit of the present principles.

Figure 13:
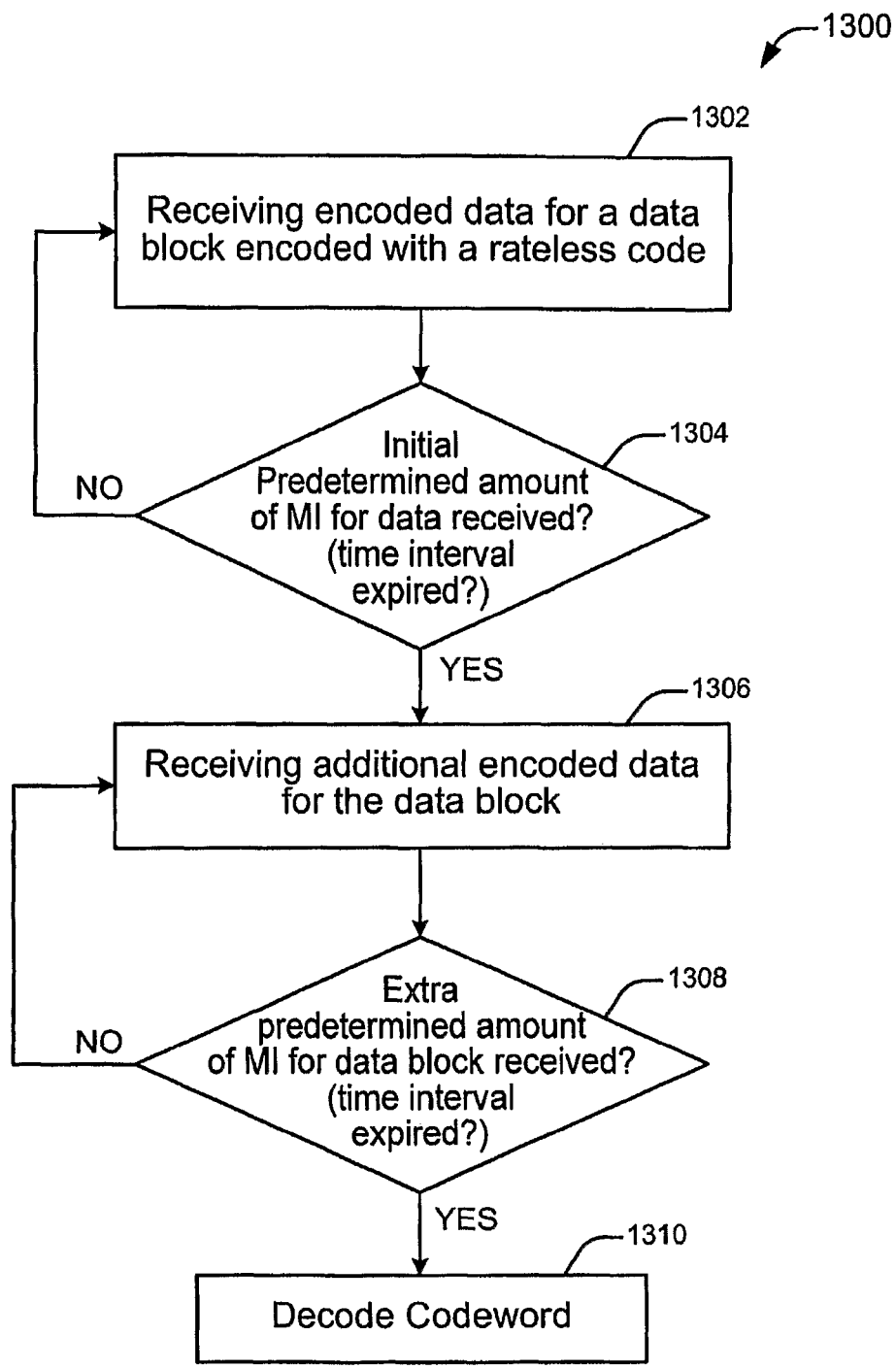
FIG. 13 is flow diagram of a method according to another aspect of the present principles.

In accordance with another implementation, the amount of initial mutual information and extra mutual information that is accumulated can be based on timing. For example, and referring to FIG. 13, there is shown a method 1300 according to another implementation of the present principles. As shown, encoded data for a data block encoded with a rateless code is received 1302. A determination is then made as to whether or not an initial predetermined amount of MI associated with the encoded data has been received 1304. This determination 1304 can be based, for example, on a time interval or based on the capacity formula of the communication medium. Further, look-up tables may be used that contain estimates of the mutual information per unit of received data based on a capacity formula for a given modulation and signal-to-noise ratio. When the decoder determines that the initial predetermined amount of MI has been received (either by the expiration of a time interval, or otherwise), the receiver begins to accumulate (receive) additional encoded data for the data block 1306. The receiver accumulates the additional or extra encoded data and corresponding MI until an extra predetermined amount of MI has been received 1308. The determination as to the extra predetermined amount of MI can be based on time, bit length, or any other known method for determining an expected amount of received data. When it has been determined that the extra predetermined amount of MI has been received, the codeword is decoded 1310 and the receiver/decoder can return to the beginning and start receiving a next transmission of encoded codewords.

As mentioned above, the first predetermined time interval is of a length that is considered sufficient to enable or allow the decoder to successfully receive and decode the encoded codeword. This first predetermined time interval may be different for different communications systems and different modulation techniques employed by such systems. Implementations may combine the two timers into a single timer.

Figure 14:
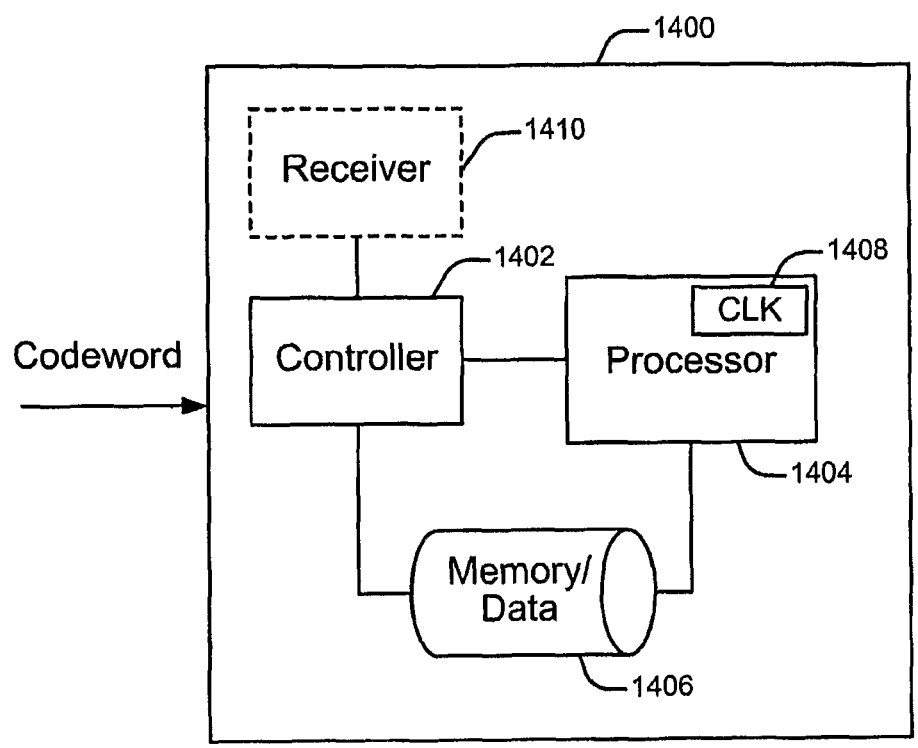
FIG. 14 is a block diagram of a decoder according to an aspect of the present principles.

FIG. 14 shows a decoder 1400 according to an implementation of the present principles. The decoder includes a controller 1402 configured to receive the mutual information (the amount of mutual information is calculated based on the received encoded codewords or other received data). Through the application of a processor 1404 and a memory 1406, the controller is further configured to receive both the initial predetermined amount of mutual information, and the extra or additional predetermined amount of mutual information. In one implementation, the decoder 1400 may include a receiver 1410 adapted to receive the mutual information.

In accordance with the present principles, the accumulation of extra or additional mutual information may provide increased reliability, however this typically comes with a trade-off of slower data rates due to the added information. In addition, the accumulation of additional or extra mutual information leads to longer codewords for the decoder to decode and therefore generally results in a higher decoding complexity. These trade-offs are acceptable for many applications. However, in view of the increased complexity in decoding and/or the slower data rates resulting from the accumulation of additional mutual information, some implementations use concatenated coding for the codewords, in which the outer code is, for example, a block code, such as a Reed Solomon or BCH code, and the inner code is a rateless code.

In one such implementation, K information bits are first encoded into a codeword of length N bits using an (N, K) outer block code. Each codeword is broken up into sub-blocks of smaller size. For example, an N-bit codeword can be broken into four sub-blocks, each having a length of N/4 bits. An inner rateless code is applied to each sub-block of the codeword. By breaking up the block codeword into sub-blocks prior to encoding with an inner rateless code, the decoding complexity of the rateless codewords can be reduced because the size of the rateless codeword required for successful decoding is expected to be smaller. Alternatively, by breaking up the codeword into sub-blocks prior to encoding with the rateless code, the outer block codes can be larger and may thereby provide more error correction for a given number of parity bits than would be achieved with several smaller block codes used serially. Additionally, larger block codes provide better burst error correction, compared to smaller block codes, by, for example, correcting bursts that a smaller block code would not be able to correct. Further, at least some of the advantages of a larger block code and a smaller rateless code may be achieved together in the same implementation.

Figure 15A:
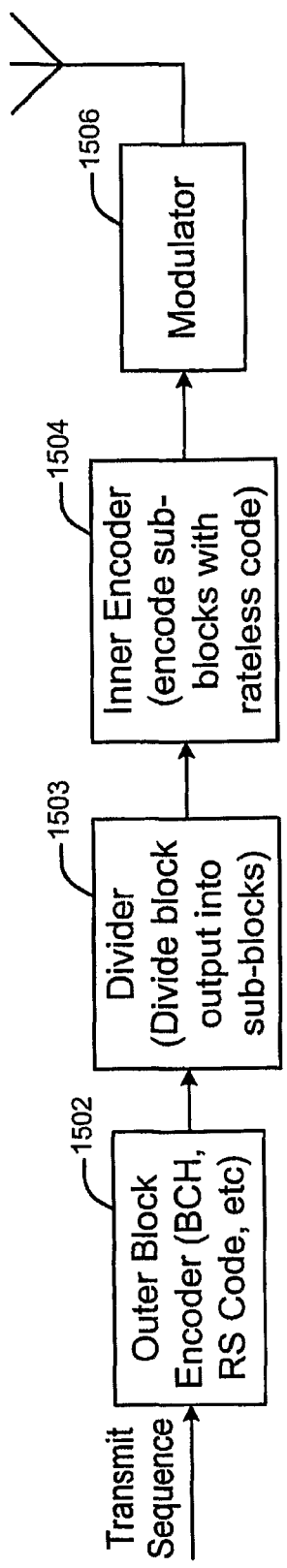
FIG. 15a is a diagram of an exemplary transmission using a concatenated coding according to a further aspect of the present principles.
Figure 15B:
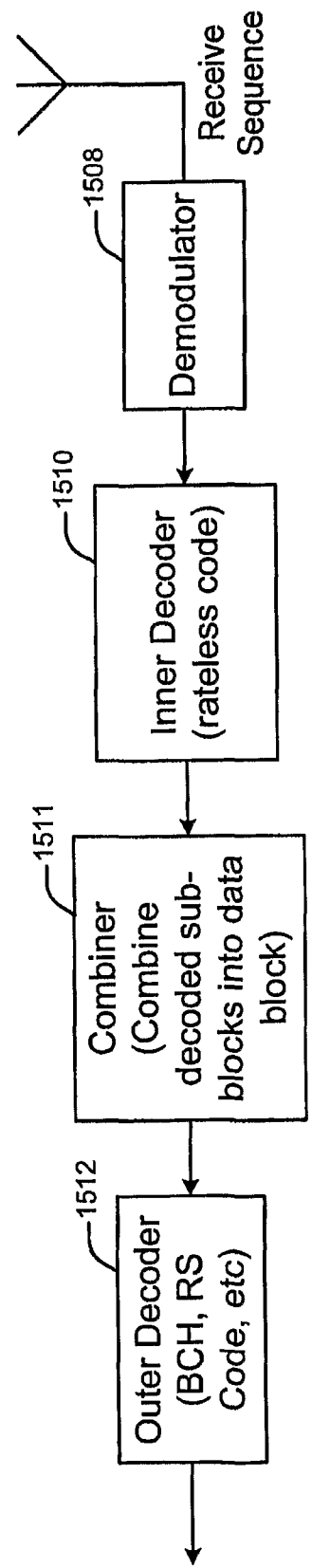
FIG. 15b is a diagram of exemplary receiving using a concatenated coding according to another aspect of the present principles.

FIGS. 15a and 15b show diagrams of the configuration for sending and receiving of codewords encoded with an inner rateless code, respectively, according to an implementation of the present principles. As shown in FIG. 15a, the transmitter/encoder sequence is input into outer encoder 1502 for encoding blocks of the input data sequence into codewords provided at the output of the encoder 1502. A divider 1503 divides the data block output into sub-blocks, and an inner encoder 1504 encodes the sub-blocks with a rateless code. The encoded transmit sequence is input to a modulator 1506 where it is modulated and transmitted via the antenna. FIG. 15b shows the receiver/decoder side, where a demodulator 1508 receives and demodulates the received modulated signal. An inner rateless code decoder 1510 decodes the rateless codes of the sub-blocks first to determine the sub-blocks, and then a combiner 1511 combines the sub-blocks into outer codewords, which are passed into the outer decoder 1512 to further remove the residual errors and clean up the decoding. The combiner 1511 and the divider 1503 may be implemented, for example, in software and/or in hardware. One software implementation uses registers and appropriate instructions, and one hardware implementation uses a shift register and appropriate logic.

Figure 16:
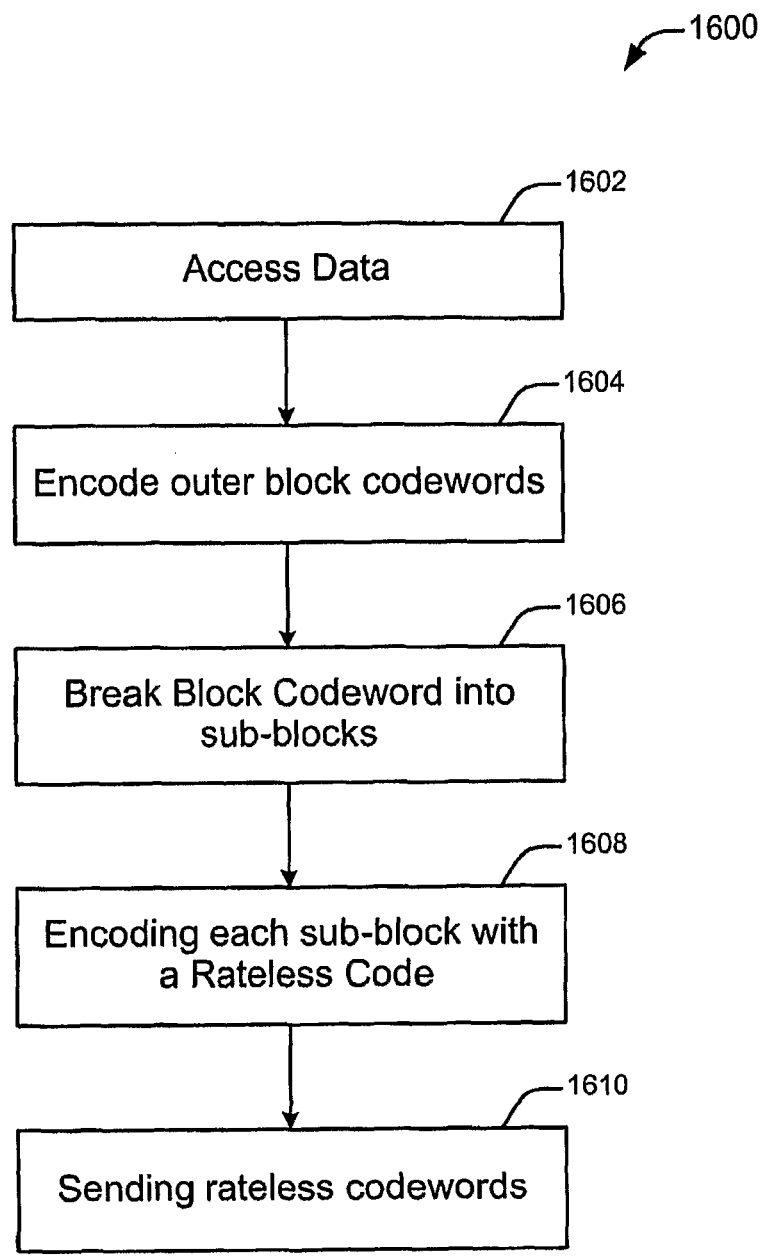
FIG. 16 is a flow diagram of a method using concatenated codes on a transmitter side of a communication system according to an implementation of the present principles.
Figure 17:
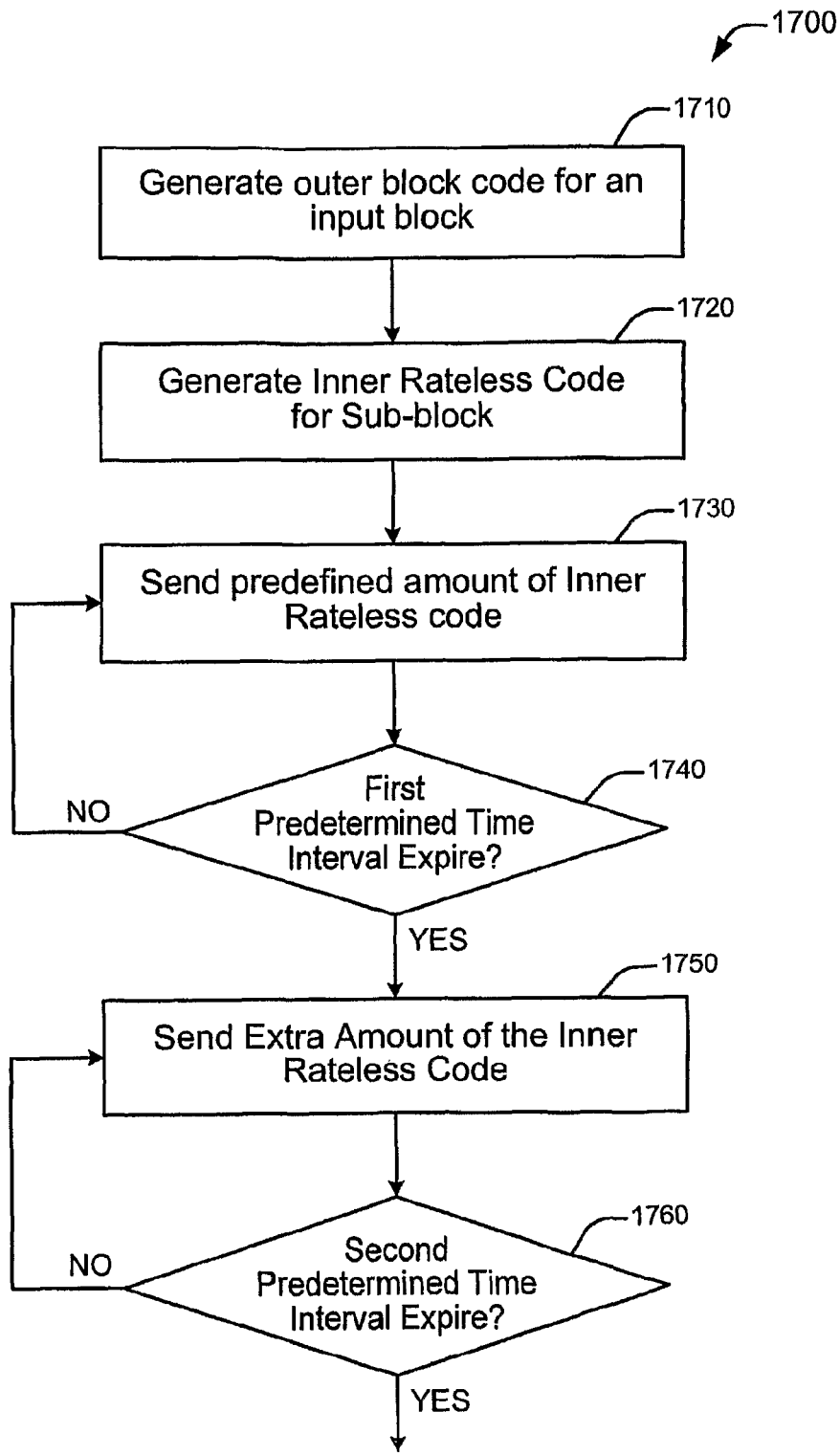
FIG. 17 is a flow diagram of a method using concatenated codes on a transmitter side of a communication system according to a further implementation of the present principles.

FIG. 16 shows a method 1600 for sending encoded data according to another implementation of the present principles. Data is accessed 1602, an outer block code is generated for the data 1604, and the outer block codeword is broken into sub-blocks 1606. Once sub-divided, the sub-block codewords are encoded using a rateless code 1608. Once encoded with a rateless code, the rateless codewords for the sub-blocks are sent 1610 to a receiver.

According to a further implementation, a method 1700 generates an outer block codeword for an input block of data 1710, and an inner rateless codeword is determined for a sub-block of the outer block codeword 1720. The method 1700 then begins sending a predetermined amount of the rateless codeword 1730. After a first time interval expires 1740, the predetermined amount is presumed to have been sent, and the method 1700 begins sending a second predetermined amount of the rateless codeword 1750. After a second time interval expires 1750, the second predetermined amount is presumed to have been sent. The method 1700 can be repeated for sending a rateless codeword for each sub-block. Further, the timers may be combined in an implementation.

Figure 18:
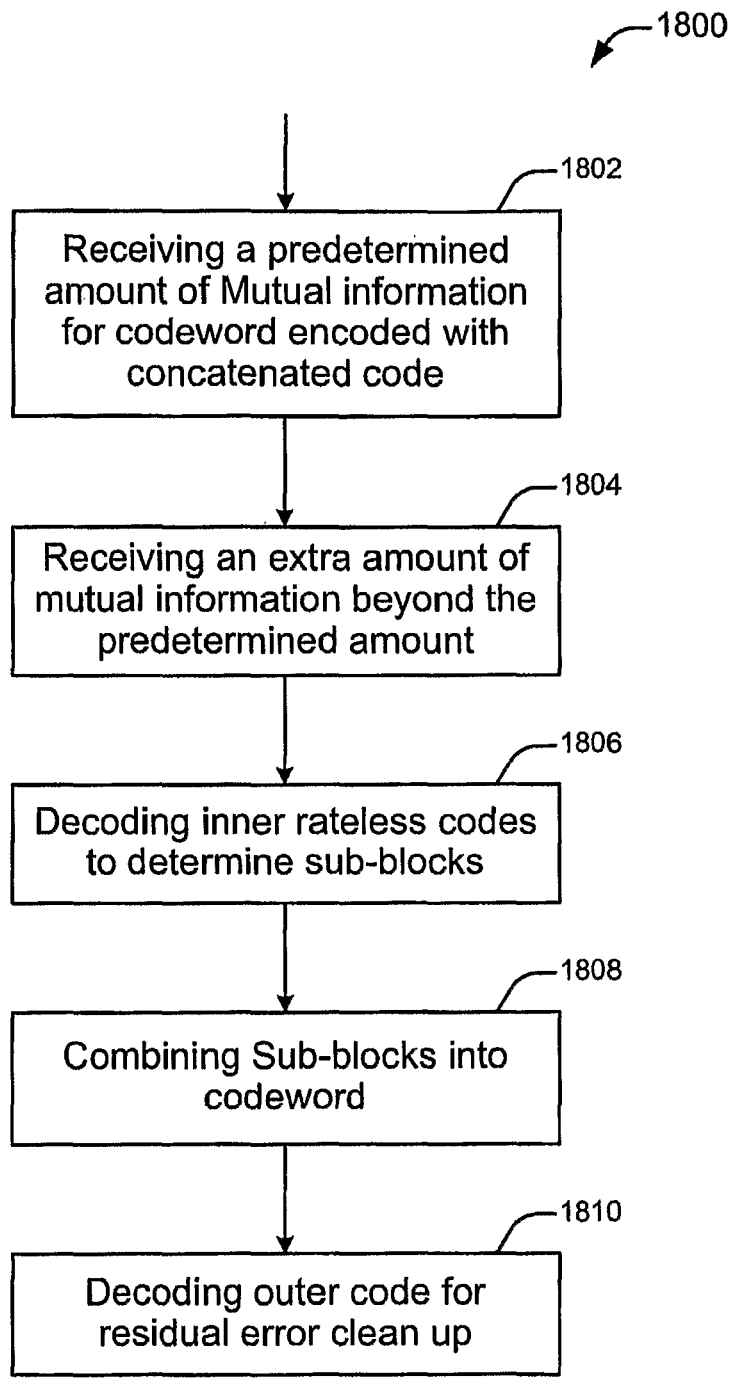
FIG. 18 is a flow diagram of a method of using concatenated codes on a receiver side of a communication system according to an implementation of the present principles.
Figure 19:
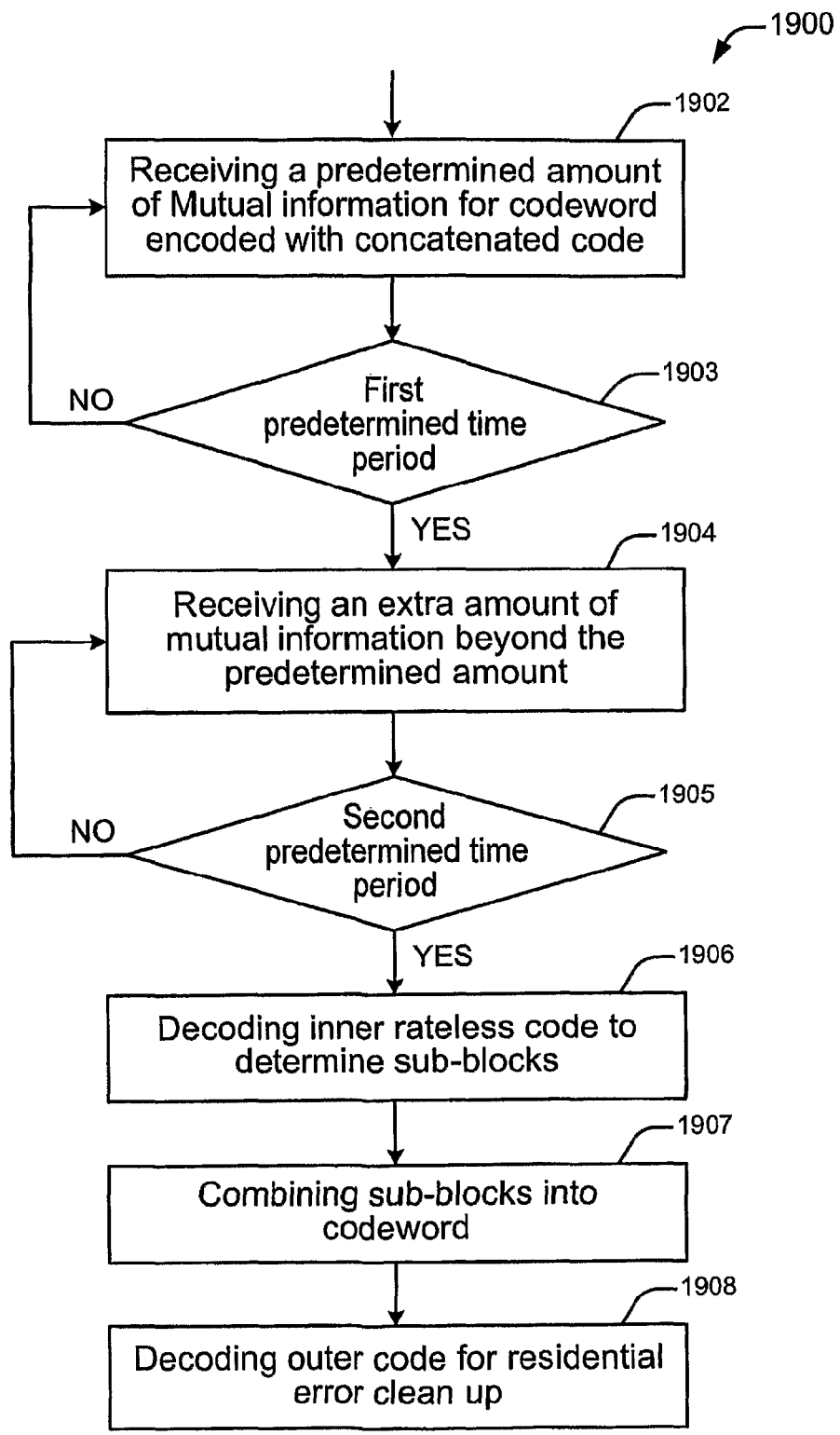
FIG. 19 is a flow diagram of a method of using concatenated codes on a receiver side of a communication system according to a further implementation of the present principles.
Figure 20:
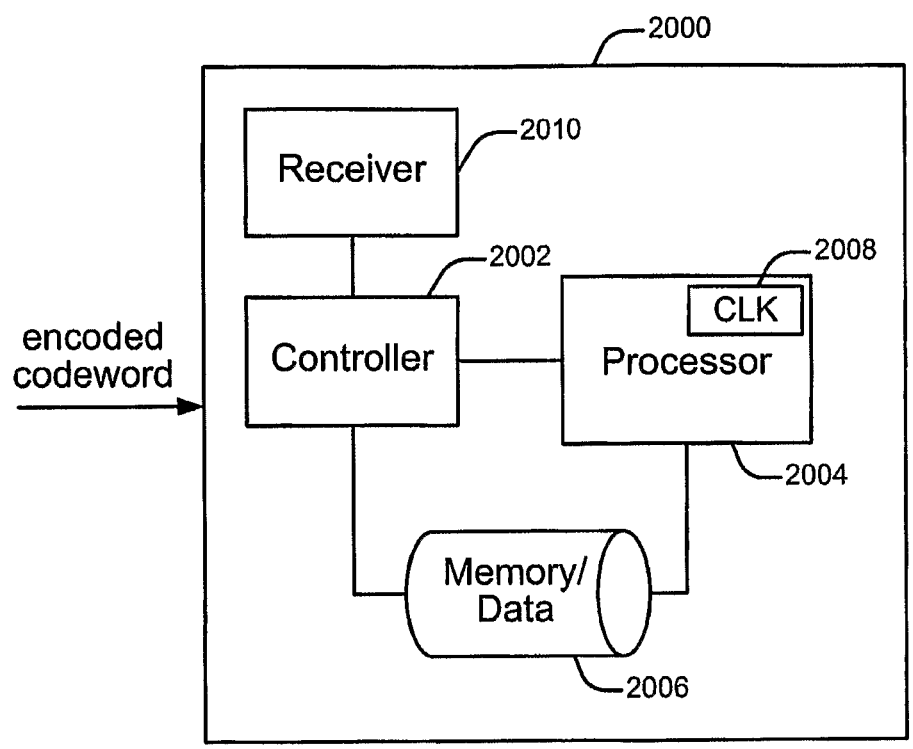
FIG. 20 is a block diagram of an apparatus according to an aspect of the present principles.

FIGS. 18-20 show another implementation of the present principles on the side of the receiver. Referring to FIG. 18, a receiver starts by receiving a predetermined amount of mutual information for a codeword encoded with a concatenated code 1802. Once the predetermined amount is received, the receiver continues to accumulate or receive an extra amount of mutual information beyond the predetermined amount 1804. Once the extra mutual information is received, the receiver is configured to decode the concatenated encoded codeword by first decoding the inner rateless codes to determine the sub-blocks 1806. Once the inner rateless code is decoded, the sub-blocks are combined to resolve the block codeword 1808. Once the block codeword is resolved, the outer code is decoded 1810 to clean up residual errors.

FIG. 19 shows another implementation where timers are established by the receiver in order to determine that enough information has been received. In the present example, the receiver starts to receive the predetermined amount of mutual information for a codeword encoded with a concatenated code 1902. A first predetermined time period 1903 is monitored for its expiration. The receiver continues to receive the predetermined amount of mutual information until the first predetermined time period expires. Upon expiration of the first predetermined time period, the "extra" or additional mutual information is received (accumulated) at the receiver 1904. This accumulation of extra mutual information is performed for a second predetermined time period 1905. Upon expiration of this second time period, the codeword is decoded by first decoding the inner rateless codes to determine the sub-blocks of the block codeword 1906. The sub-blocks are then combined to resolve the block codeword 1907. Once combined, the outer block code is decoded 1908 to clean up residual errors.

FIG. 20 shows a block diagram of a decoder 2000 according to one implementation of the present principles. As shown, the decoder 2000 includes a controller 2002, a processor 2004, and a memory 2006. The controller 2002 is configured to receive the encoded codewords (which provide the mutual information) through receiver 2010. The processor 2004 includes a clock 2008 and can be programmed to establish all time intervals required for receiving mutual information. The memory 2006' is part of the decoder 2000 and can include information, such as, for example, the requisite time intervals or periods for mutual information receipt depending on things such as, for example, the modulation scheme being used to transmit the encoded data. The decoder 2000 is further configured to decode the inner rateless code of the respective sub-blocks such that they can be combined to resolve the codeword. The decoding of the outer codes is performed after the codeword has been resolved by the decoding of the inner rateless codes and the combination of the sub-blocks.

Those of skill in the art will recognize that the controller and processor can be configured separately to function together, or alternatively could be embodied in a single device having corresponding program and logic to function as described herein.

The use of acknowledgement signals in layered communication systems employing rateless codes has its advantages, as discussed above. Particularly, an acknowledgement can be sent as soon as enough mutual information has been deemed received. However, although valuable, the sending of such acknowledgements may not take full advantage of the communication channel (for example, may not utilize the full capacity of the channel to increase data rates).

By way of example, when the modulation on each channel is BPSK or QPSK, the channel may support a higher order of modulation (e.g., 16-QAM), which will, in turn, support higher data rates.

There are several ways to determine whether such modulation scheme modifications are possible. The implementations shown and described with reference to FIG. 21-34 are for exemplary purposes and show the use of a communication quality determination. Those of skill in the art will recognize that other methods and/or implementations of the same concepts can be made without departing from the spirit of the present principles.

Figure 21:
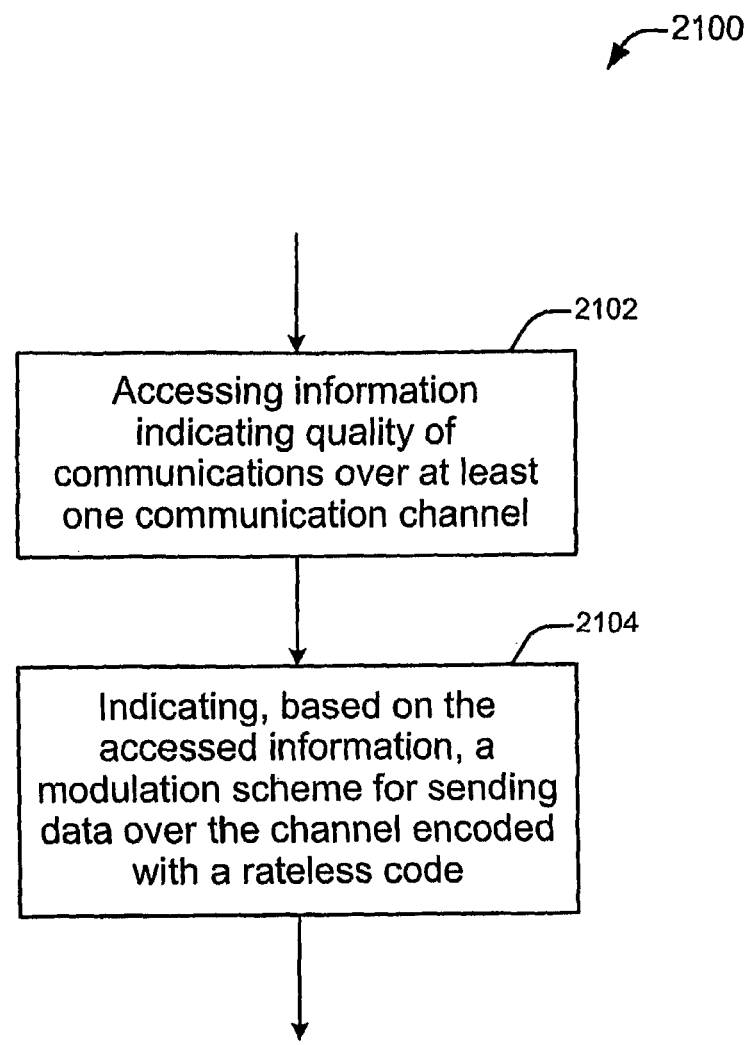
FIG. 21 is a flow diagram of a method for modifying a modulation scheme according to an aspect of the present principles.

Referring to FIG. 21, there is shown a method 2100 according to an implementation of the present principles. Initially, information is accessed 2102 relating to the quality of communications over the at least one communication channel. Based on that accessed information, an indication is provided 2104 for a modulation scheme to be used to send data over the channel encoded with a rateless code. In this example, the information relating to the quality of the communication channel can be the frequency of occurrences of indication signals within a pre-designated or predetermined time period.

Figure 22:
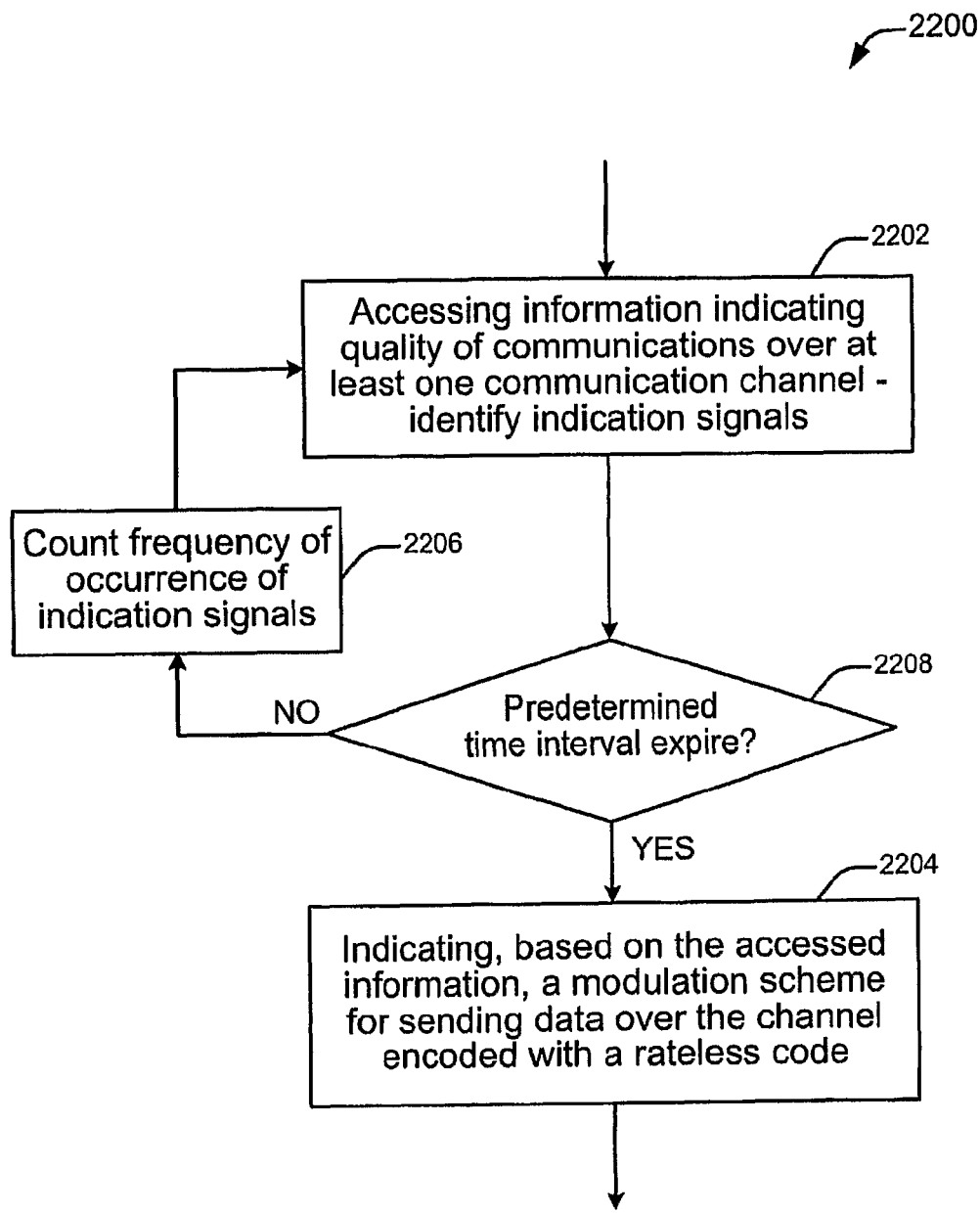
FIG. 22 is a flow diagram of a method for modifying a modulation scheme according to another aspect of the present principles.

FIG. 22 shows a modified implementation of the method of FIG. 21. In this method 2200, information relating to the quality of the communications over the at least one communication channel is accessed 2202, and indication signals are identified. Upon initiation of the accessing, a time interval is established 2208. During the time interval, the number or frequency of occurrences of identified indications signals 2206 is counted. Upon expiration of the time interval, a modulation scheme for transmitting subsequent data is indicated 2204 in response to and based upon the accessed information relating to quality. The length of the predetermined time interval 2208 can be any suitable length of time based on, for example, a current modulation scheme being used, an estimated time period based on expected results, etc.

Figure 23:
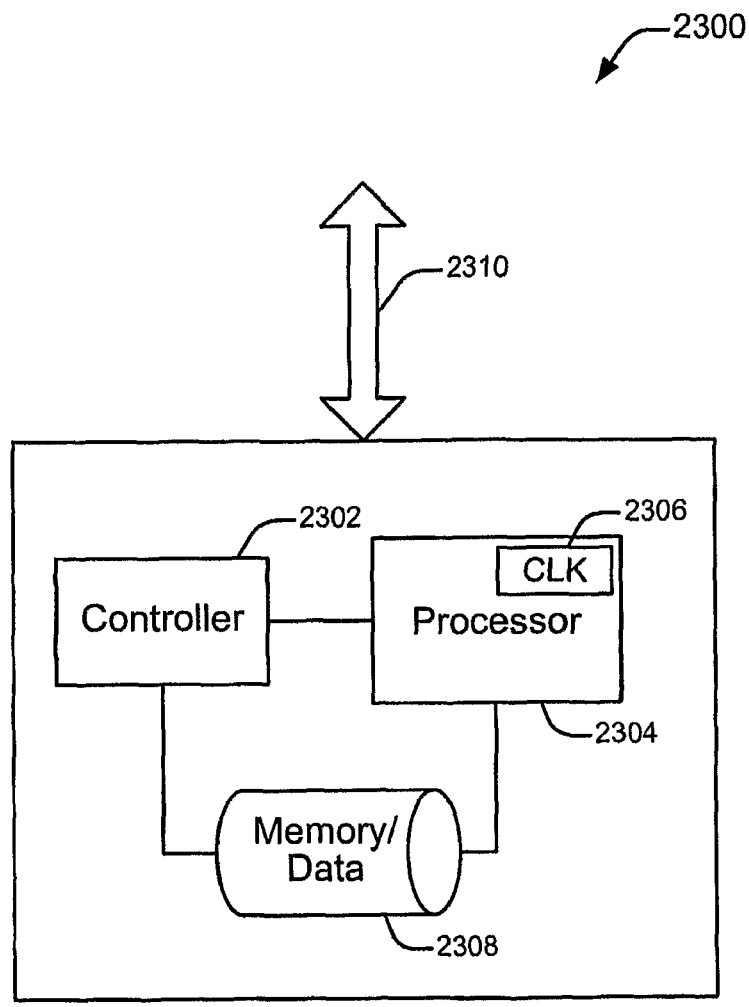
FIG. 23 is a block diagram of an apparatus for modifying a modulation scheme according to an aspect of the present principles.

FIG. 23 shows an apparatus 2300 according to an implementation of the present principles. The apparatus includes a controller 2302, a processor 2304 having a clock 2306, a memory 2308, and connection to a bi-directional communication channel 2310. As discussed above, the quality of communications over the communication channel 2310 is determined and used to indicate a modulation scheme to be used for the channel. In this manner, controller 2302 accesses information relating to the quality of the communication channel 2310. Processor 2304 is configured to provide the indication for a modified modulation scheme for the subsequent sending of data encoded with a rateless code over the communication channel 2310 using the accessed quality information.

By way of example, processor 2304 has been shown with a clock 2306. Those of skill in the art will recognize that the clock 2306 can be implemented in many different ways without departing from the spirit of the present principles. For purposes of this example, clock 2306 can be used to establish a predetermined time interval, during which, the controller 2302 accesses the information relating to the quality of the communication channel 2310. In this manner, the monitoring of the communication quality over the channel 2310 can be limited to a pre-set or predetermined time period, which assists in meeting any of the real time constraints of the communication system.

Figure 24:
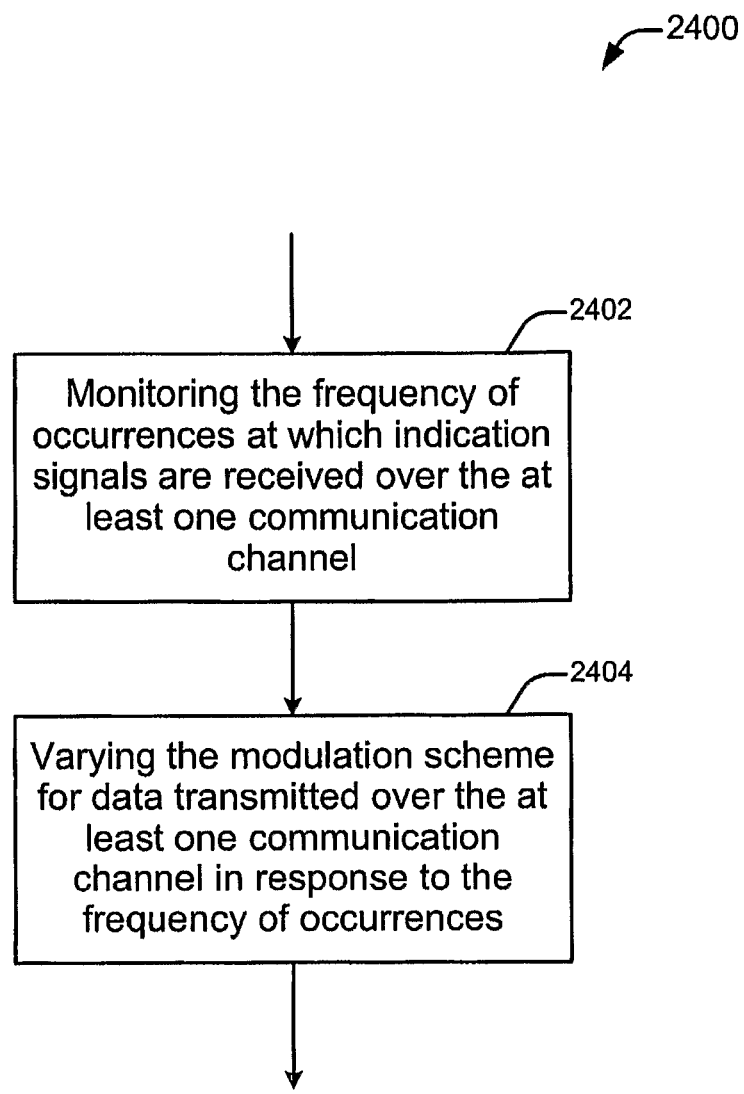
FIG. 24 is a flow diagram of a method for modifying a modulation scheme according to a further aspect of the present principles.

FIG. 24 shows the method according to another implementation of the present principles. In this example, a decoder monitors the frequency of occurrences at which indications signals are received over the at least one communication channel 2402. These indication signals are indicative of the quality of the communications over the at least one communication channel. Based on the monitored frequency of occurrences of such indication signals, the modulation scheme being used to transmit data on the communication channel can be varied or changed 2404 for subsequent data transmissions. This variation or change can be, for example, an instruction to increase the modulation order for higher data rates, or alternatively, an instruction to decrease the modulation order, which results in lower bit rates, but increased reliability of the data when it has been determined that the communication channel can better support the lower order of modulation.

According to several exemplary implementations, the form of the indication signals can be acknowledgement signals (e.g., ACK), negative acknowledgement signals (HACK), or any other designated signal whose generation or receipt can be used to determine the communication channel quality. Examples of the use of ACKs and NACKs have been described earlier.

Figure 25:
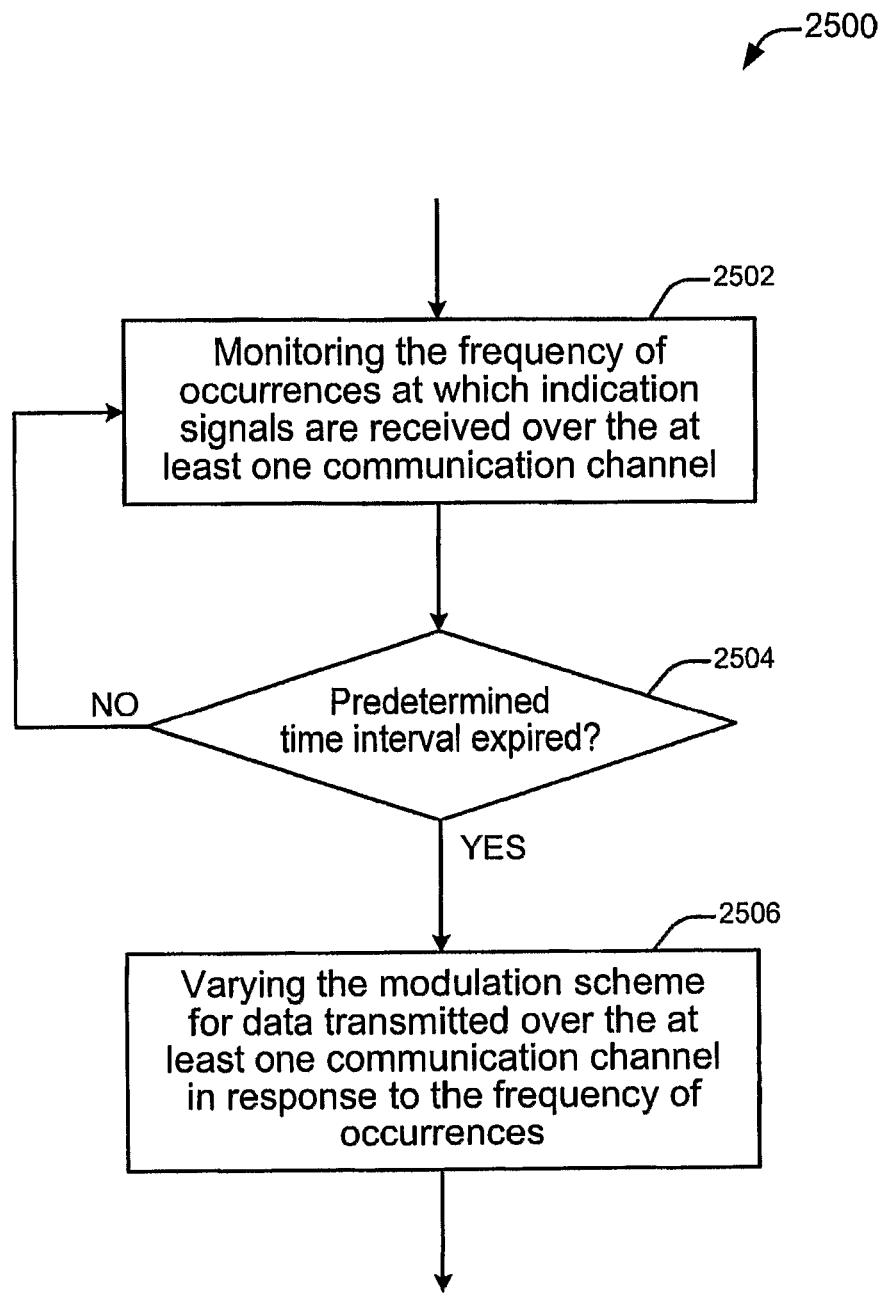
FIG. 25 is a flow diagram of a method for modifying a modulation scheme according to yet another aspect of the present principles.

FIG. 25 shows a further modified method of the implementation of FIG. 24, where a time interval is imposed on the monitoring of the frequency of occurrences of the received indication signals. As shown, the frequency of occurrences of received indication signals is monitored 2502 during a predetermined time interval 2504. Upon expiration of the predetermined time interval 2504, the modulation scheme used to transmit subsequent data over the at least one communication channel is varied 2506 to maximize the modulation scheme and increase data rates to the highest the channel can support. However, as mentioned above, the variation of the modulation scheme could be a reduction or request for lower order modulation, as the communication channel may not be capable of supporting higher orders of modulation. Implementations may vary in how they determine whether a channel is capable of supporting higher orders of modulation. For example, one implementation declares that a channel can support a particular modulation format (order) only if there is a high expectation that all errors will be corrected (using a typical forward-error-correction code) in data sent over the channel.

Figure 26:
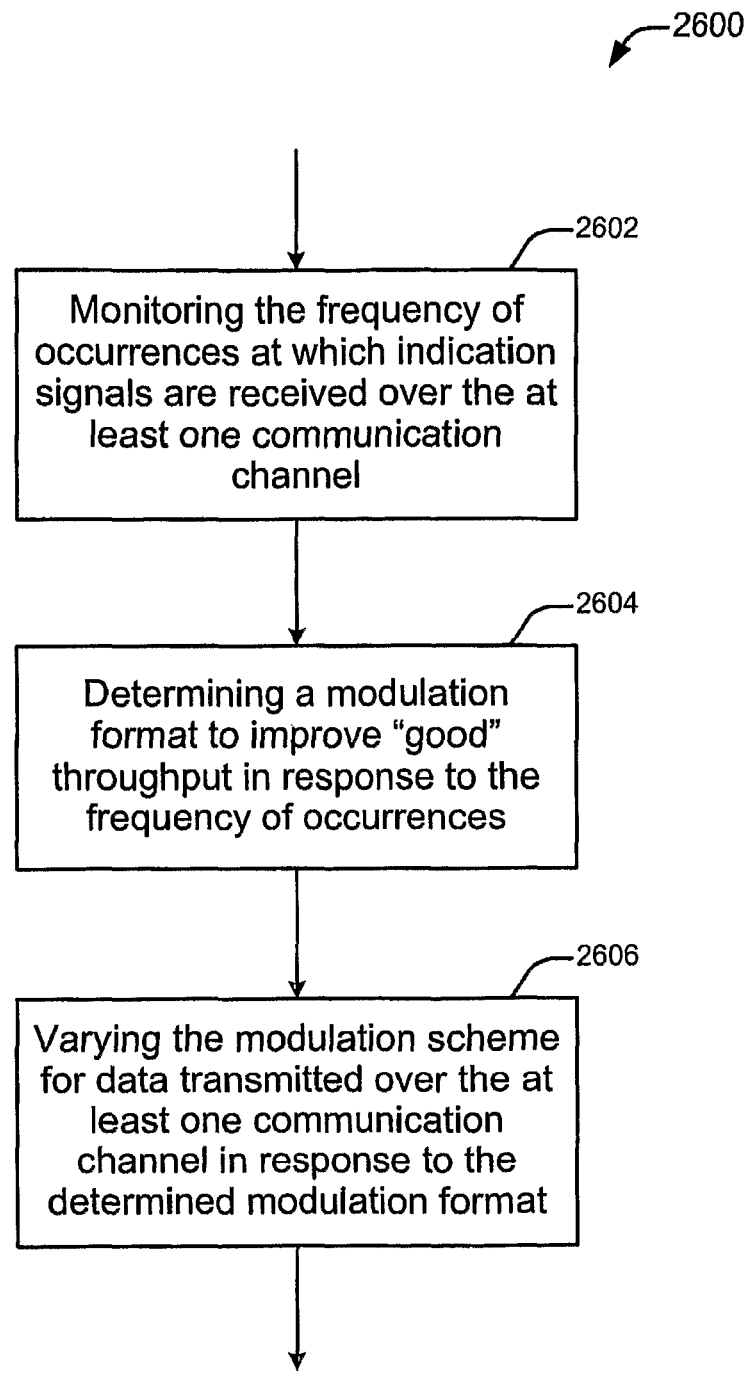
FIG. 26 is a flow diagram of a method for modifying a modulation scheme according to another aspect of the present principles.

FIG. 26 shows a method 2600 according to a further implementation of the present principles. Initially, the frequency of occurrences of the received indication signals is monitored 2602. At this point, a determination is made 2604 of a modulation format that is expected to improve, or perhaps maximize, the "good" throughput (the amount of data per unit time that is correctly received and decoded). The determined format may be an optimal modulation format that can be supported by the at least one communication channel using the frequency of occurrence of indication signals data. LUTs may be developed, for example, to correlate ACK frequency (for a given modulation format) with the highest modulation format that can be supported. The subsequent varying of the modulation scheme 2606 is performed using the determined modulation format supported by the channel.

Figure 27:
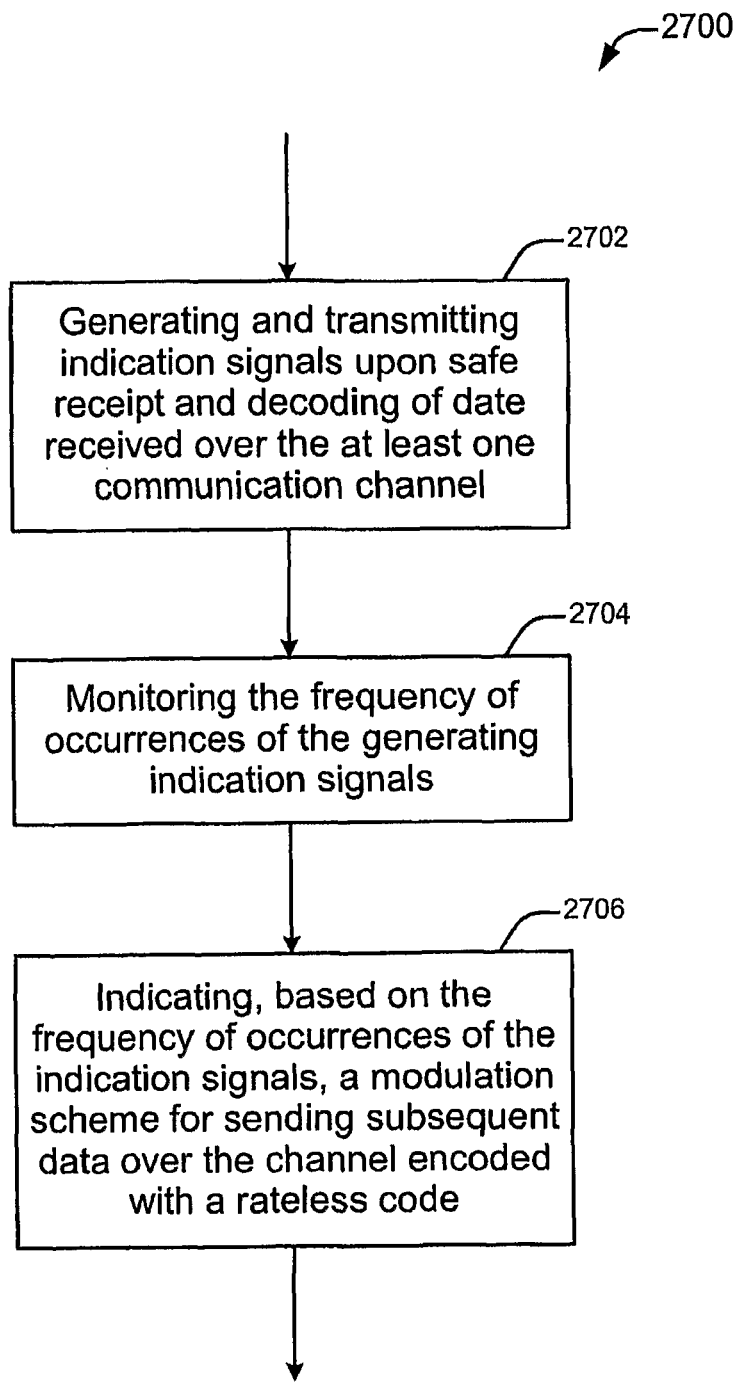
FIG. 27 is a flow diagram of a method for modifying a modulation scheme according to another aspect of the present principles.

FIG. 27 shows a method 2700 according to another implementation of the present principles. In this implementation, the receiver of transmitted data generates and transmits indication signals to the transmitter indicating safe receipt and decoding of data 2702 received over the at least one communication channel. The frequency of occurrences of the generating indication signals is monitored 2704. Based on the monitored frequency of occurrences of the indication signals, an indication of a modulation scheme for sending subsequent data over the channel (2706) is provided to the source of the received data.

Figure 28:
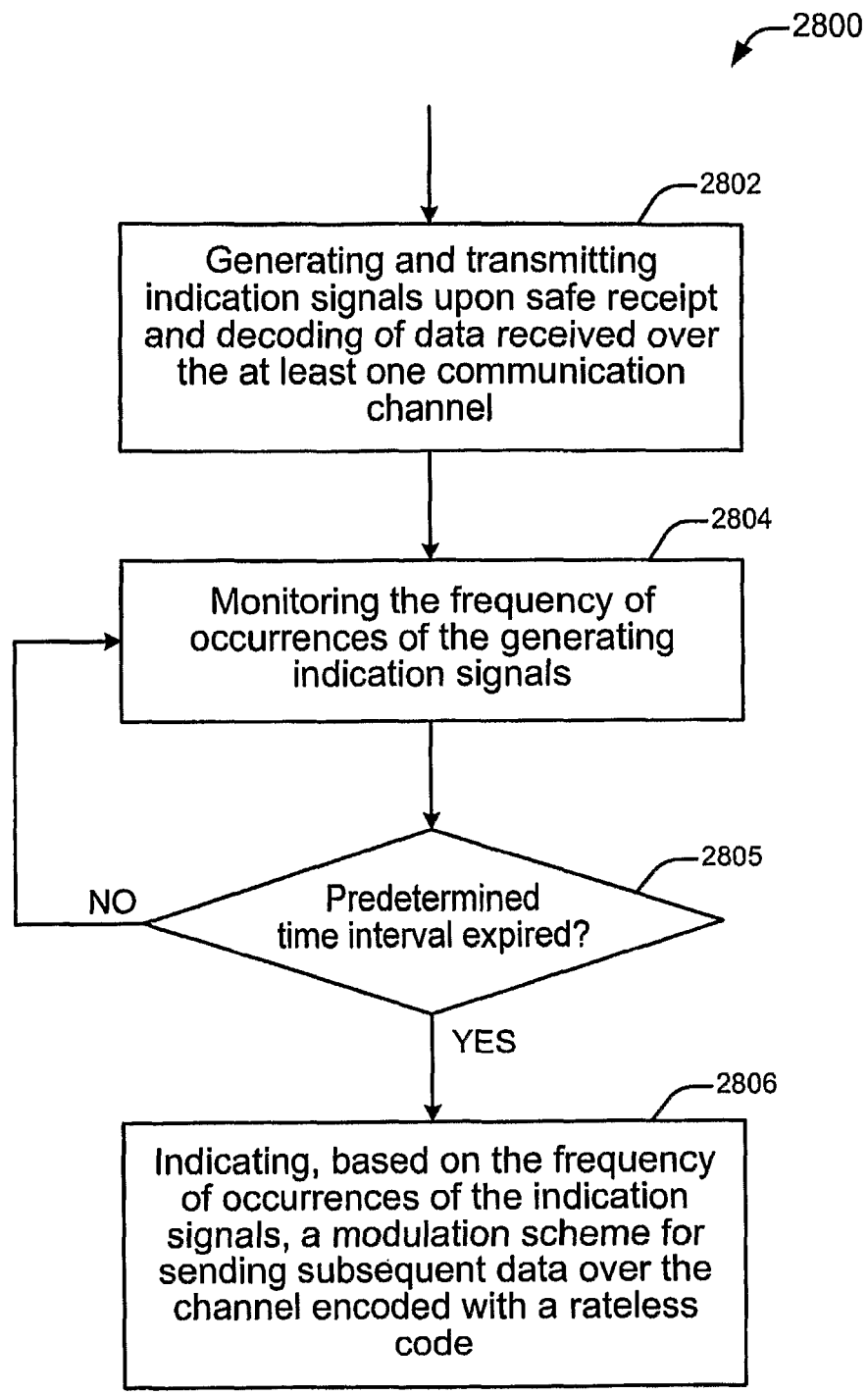
FIG. 28 is a flow diagram of a method for modifying a modulation scheme according to a further aspect of the present principles.

FIG. 28 shows a modified method 2800 of the method shown in FIG. 27. In this implementation, a predetermined time interval is established 2805 for timing the monitoring of the frequency of occurrences of the generated indication signals 2804. Upon expiration of the predetermined time interval, the receiver indicates a modulation scheme for subsequent data transmitted over the at least one communication channel 2806.

Figure 29:
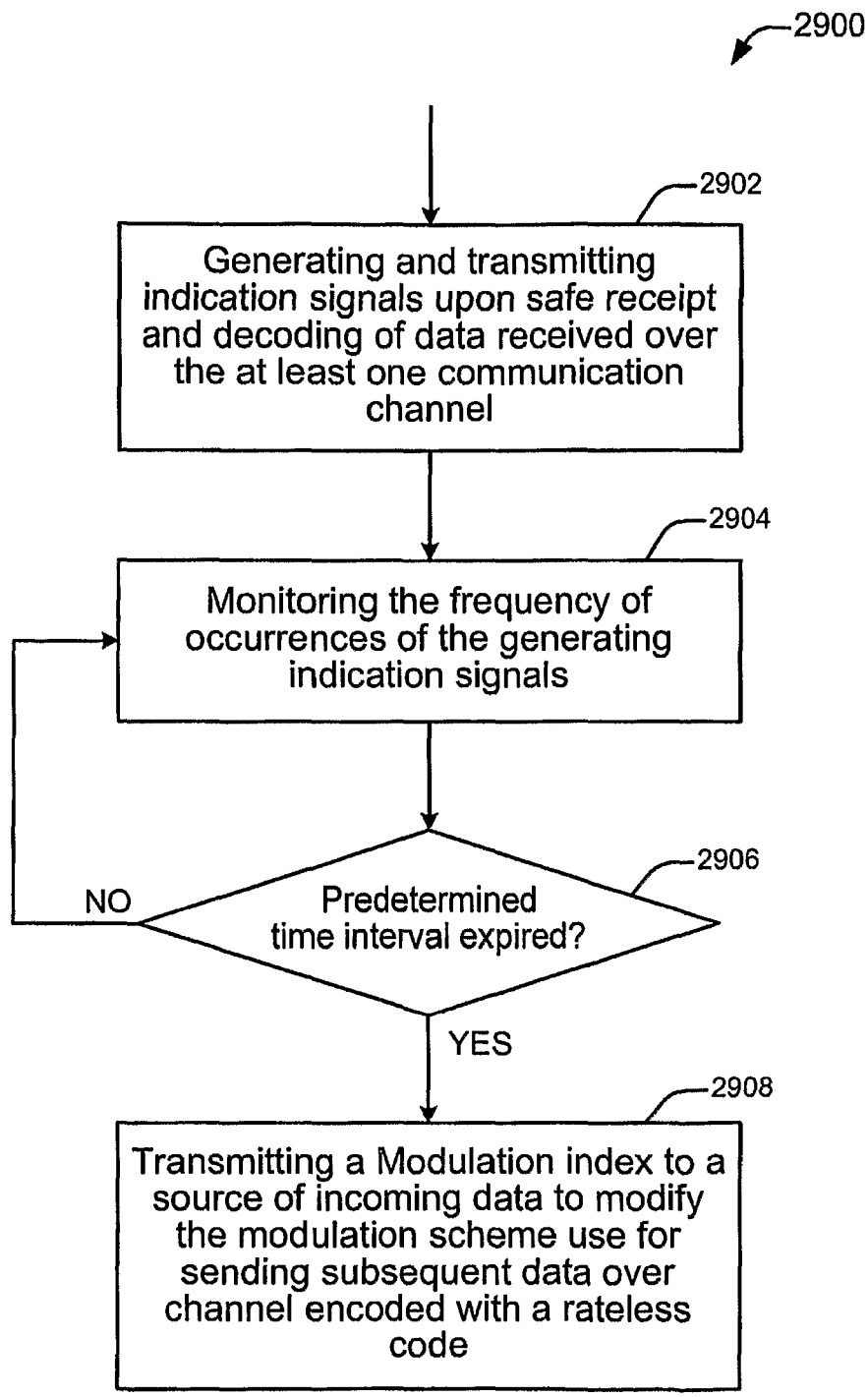
FIG. 29 is a flow diagram of a method for modifying a modulation scheme according to another aspect of the present principles.

FIG. 29 shows another implementation of the method 2900 according to the present principles. As shown, the receiver generates and transmits indication signals 2902 to the source of the received data, and the frequency of occurrences of the same is monitored 2904. As before, in this implementation, the monitoring is performed for a predetermined time interval 2906. When the time interval expires, the receiver transmits a modulation index 2908 to the source of incoming data to modify the modulation scheme used to transmit subsequent data over the at least one communication channel.

The modulation index can be any type of signal that the transmitter/encoder can recognize and act upon. For example, the modulation index can be a control signal provided in a header of other data being fed back from the receiver to the transmitter. In other implementations, it can be part of the indication signal (either ACK or NACK). Those of skill in the art will recognize that the form of the modulation index can be any suitable form.

Figure 30:
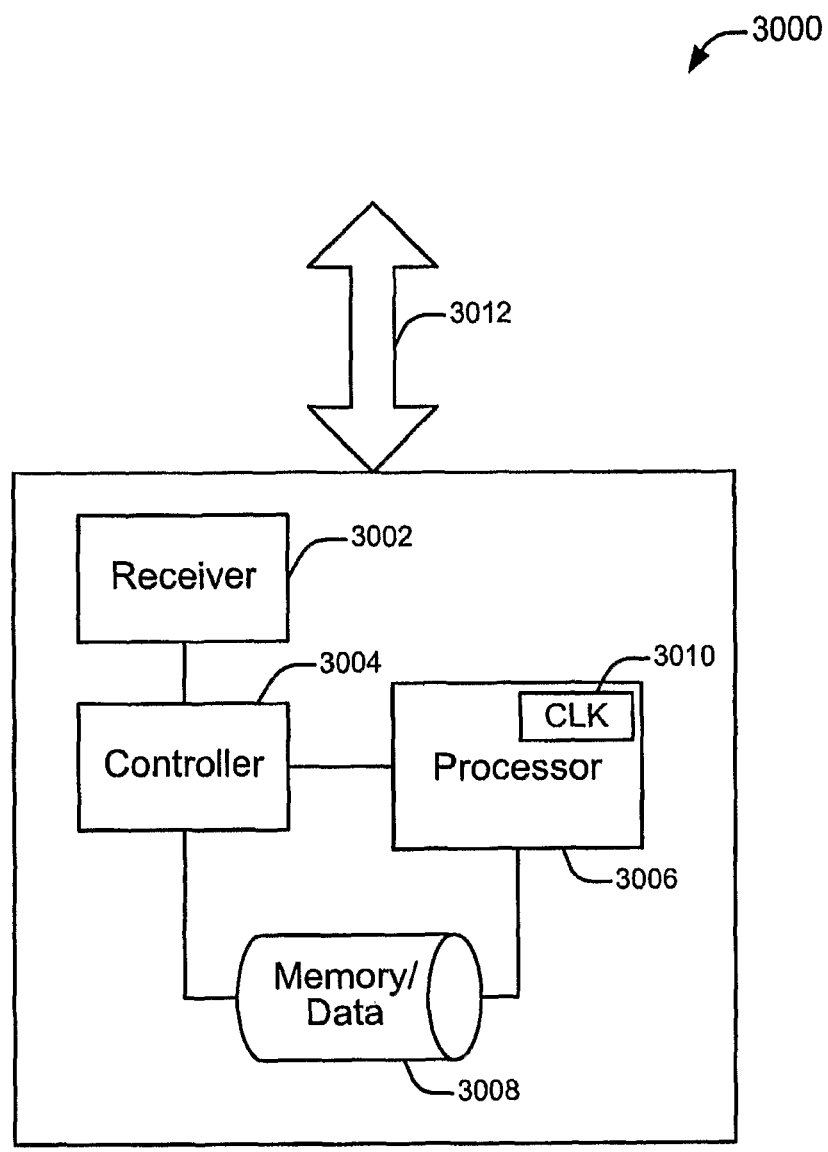
FIG. 30 is a block diagram of an apparatus for modifying a modulation scheme according to another aspect of the present principles.

FIG. 30 shows a decoder 3000 according to one implementation of the present principles. The decoder 3000 includes a receiver 3002 configured to receive incoming data via the at least one communication channel 3012. The incoming data may be encoded with a rateless code. A controller 3004 is configured to compute a quality metric for the communication channel 3012. The quality metric represents the capacity of the at least one communication channel. Once the quality metric is computed, the controller, in conjunction with a processor 3006, causes the decoder to generate a modulation index using the computed quality metric. As discussed above, the modulation index is a control signal that is fed back to the source of transmitted data to provide said source with instructions to modify the modulation scheme being used to transmit subsequent data over the communication channel 3012. The decoder 3000 also includes a memory/data unit 3008 and a clock 3010.

In accordance with this implementation, the quality metric is a tangible determination as to the level of quality that can be obtained on the communication channel 3012. One example of such quality metric would be the Signal to Noise (SNR) ratio of the channel 3012. Using the SNR of the channel, along with other known information, such as, for example, the current modulation scheme, a new or modified modulation scheme can be identified for maximizing the use of the channel. In systems, such as a layered communication system where there are multiple communication channels for transmitting the modulated data, an average SNR for all the channels can be used as the quality metric or an average SNR for each channel can be used as the quality metric of each channel. The average could be an average over the layers, an average over time, etc. In other alternative implementations, a block wise SNR may also be used without departing from the spirit of the present principles. Other implementations may include a peak SNR determination for use as the quality metric.

Figure 31:
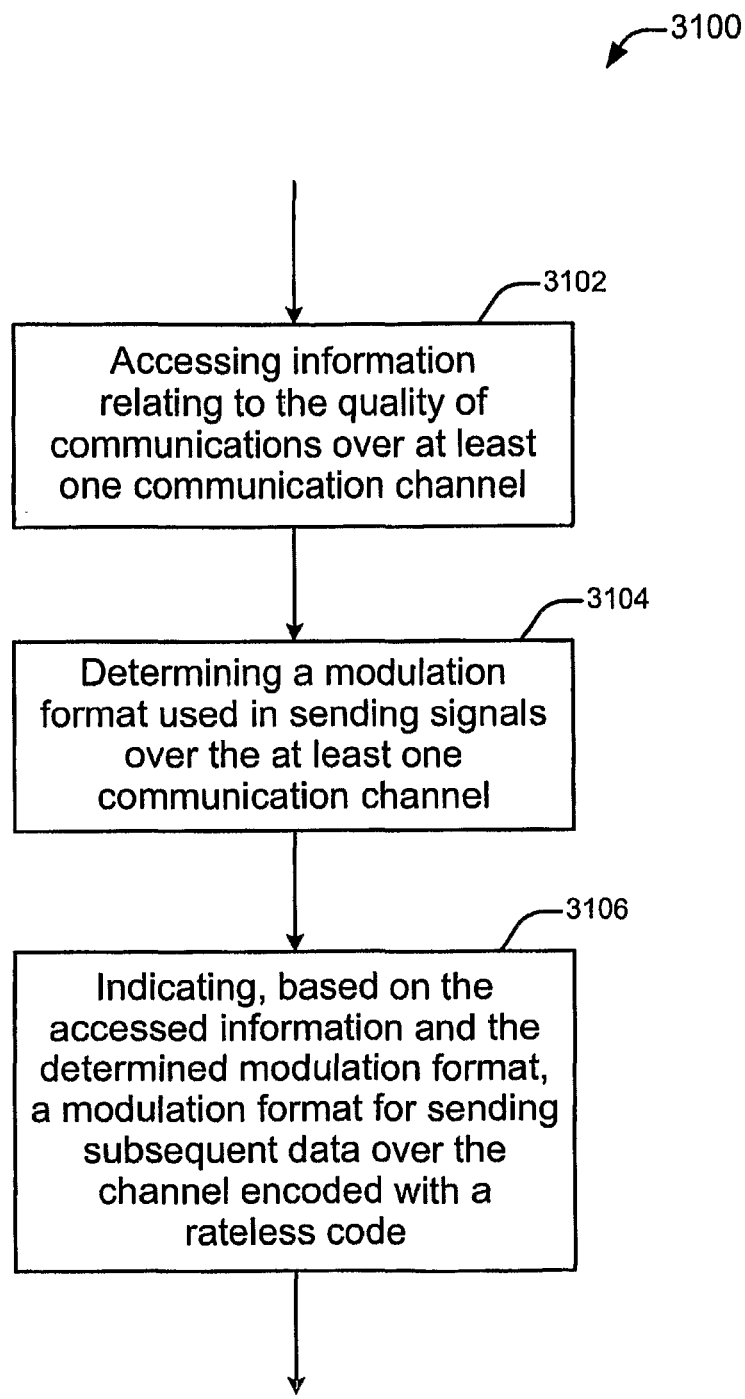
FIG. 31 is a flow diagram of a method for modifying a modulation scheme according to another aspect of the present principles.

Referring to FIG. 31, there is a shown an exemplary method 3100 implemented by the decoder 3000 according to an aspect of the present principles. Initially, the decoder accesses information relating to the quality of the communication over the at least one communication channel 3102. A determination is then made as to the modulation format currently being used 3104 in sending signals over the at least one communication channel. Once the current modulation format is determined, the decoder can use that information, in conjunction with the accessed quality information and provide an indication 3106 to a source of received data with instructions to modify the modulation format used for sending subsequent data.

Figure 32:
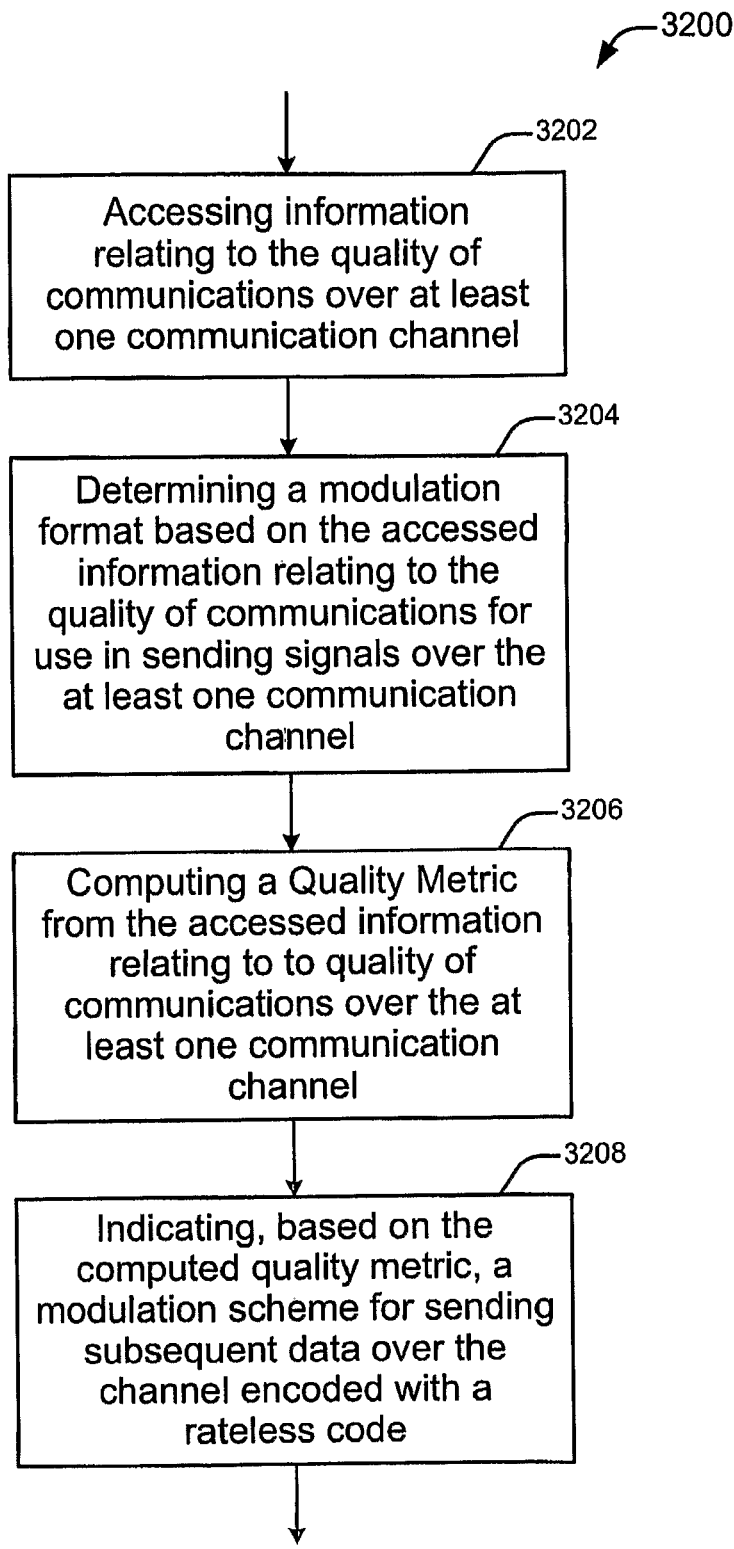
FIG. 32 is a flow diagram of a method for modifying a modulation scheme according to another aspect of the present principles.

According to another implementation, shown in FIG. 32, a method 3200 provides for accessing information relating to the quality of communications 3202, and for determining the current modulation format 3204 being used on the at least one communication channel. The quality metric (for example, SNR or frequency of ACKs) is then computed 3206 from the accessed information relating to the quality of the communication channel. The computed quality metric is then used, in conjunction with the known or current modulation format, to indicate a modulation scheme to be used for sending subsequent data over the channel 3208.

Figure 33:
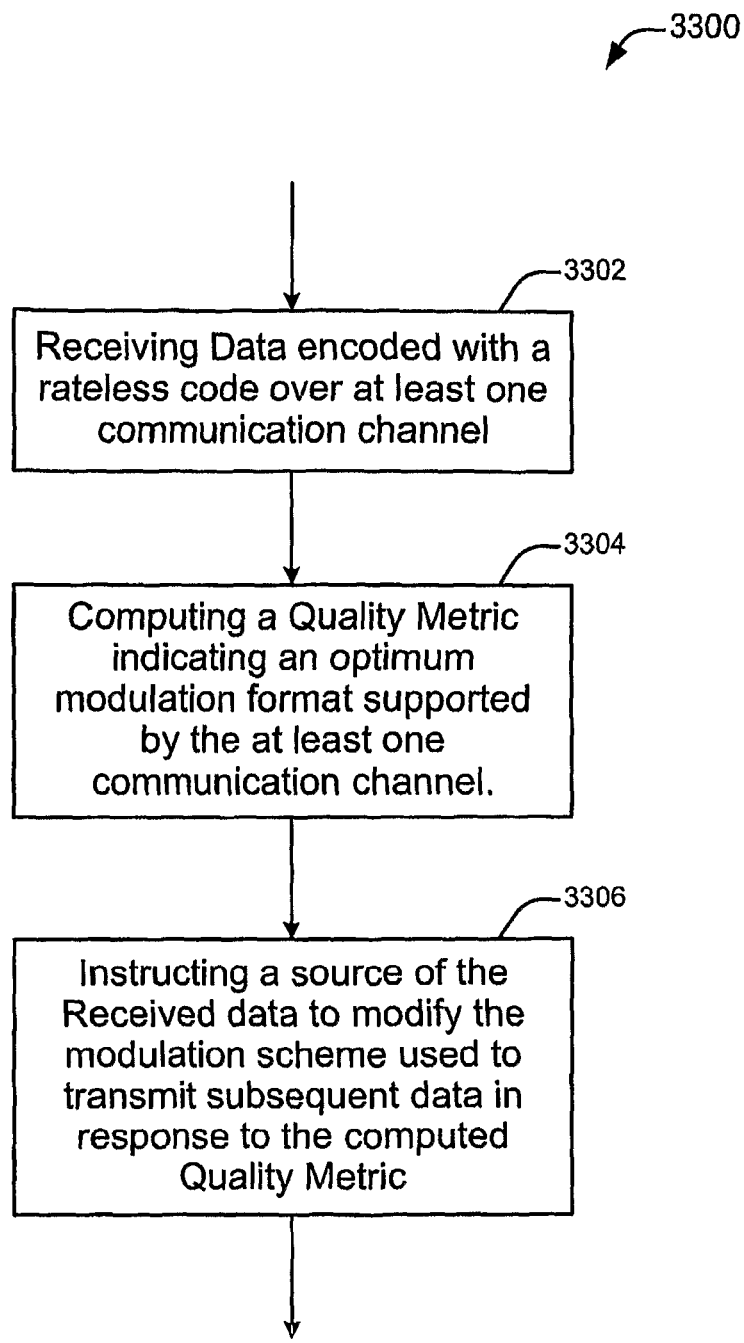
FIG. 33 is a flow diagram of a method for modifying a modulation scheme according to another aspect of the present principles.

FIG. 33 shows another implementation of the method 3300 according to the present principles. In this implementation, the decoder receives data encoded with a rateless code 3302. Using this data, the decoder computes a quality metric 3304 which provides information relating to the optimum modulation format supported by the at least one communication channel.

Using the computed quality metric, the decoder instructs the source of the received data to modify the modulation scheme used to transmit subsequent data over the at least one communication channel 3306.

Figure 34:
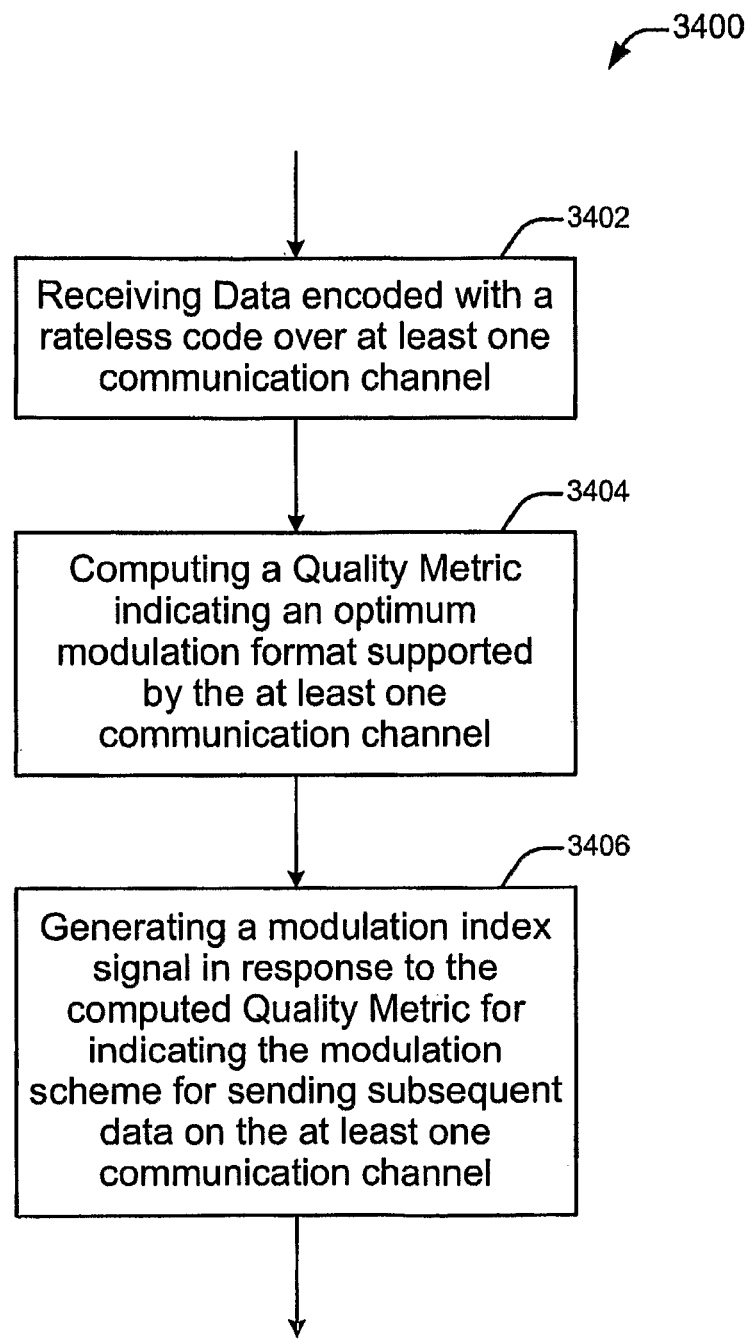
FIG. 34 is a flow diagram of a method for modifying a modulation scheme according to another aspect of the present principles.

FIG. 34 shows a modified method implementation 3400 of the method 3300 shown in FIG. 33. As before, the decoder receives data encoded with a rateless code 3402, and computes the quality metric 3404 indicating the optimum modulation format supported by the at least one communication channel. The decoder then generates a modulation index signal in response to the computed quality metric for indicating a modulation scheme to be used by the source of the received data for sending subsequent data over the at least one communication channel.

As should be clear, many implementations described in this application may be performed by a receiver, a transmitter, or both.

The various aspects, implementations, and features may be implemented in one or more of a variety of manners, even if described above without reference to a particular manner or using only one manner. For example, the various aspects, implementations, and features may be implemented using, for example, one or more of a method, an apparatus, an apparatus or processing device for performing a method, a program or other set of instructions, an apparatus that includes a program or a set of instructions, and a computer readable medium.

An apparatus may include, for example, discrete or integrated hardware, firmware, and software. As an example, an apparatus may include, for example, a processor, which refers to processing devices in general, including, for example, a microprocessor, an integrated circuit, or a programmable logic device. As another example, an apparatus may include one or more computer readable media having instructions for carrying out one or more processes.

A computer readable medium may include, for example, a software carrier or other storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device that includes a computer readable medium having instructions for carrying out a process.

A number of implementations have been described. Nevertheless, it will be understood that various modifications may be made. For example, elements of different implementations may be combined, supplemented, modified, or removed to produce other implementations. Accordingly, other implementations are within the scope of the following claims.

The invention claimed is:

1. A method comprising:
receiving initial encoded data that has been encoded with a rateless code;
determining a quality metric for a communication medium on which the initial encoded data has been received;
identifying a modulation scheme used in sending the initial encoded data on the communication medium;
determining, based on the identified modulation scheme and the determined quality metric, an estimate of an amount of mutual information being received for the received rateless encoded data, wherein the amount of mutual information is useful for indicating whether a decoder is able to decode the received rateless encoded data; and
determining an amount of mutual information being received based on the determined estimate.

2. The method of claim 1, wherein determining the estimate of the amount of mutual information comprises:
accessing a look-up table, based on the identified modulation scheme and the determined quality metric; and
accessing an entry in the accessed look-up table that provides an estimate of an amount of mutual information being received per unit of received encoded data.

3. The method of claim 1, wherein the estimate of the amount of mutual information is based on a capacity formula corresponding to the identified modulation scheme.

4. The method of claim 1 further comprising:
determining a modulation format supported by the communication medium based on the determined quality metric; and
receiving, based on the determined modulation format, subsequent encoded data that has been encoded with the rateless code.

5. The method of claim 4, further comprising feeding back a modified modulation scheme based on the determined modulation format supported by the channel such that a subsequently received codeword is transmitted using said modified modulation scheme.

6. The method of claim 5, wherein said receiving a subsequent codeword further comprises determining, based on the determined modulation format supported by the communication medium, how much mutual information to receive in order to decode the encoded codeword using the modified modulation scheme.

7. The method of claim 5, wherein said receiving a subsequent codeword further comprises determining, based on the determined modulation format supported by the communication medium, how long to receive the mutual information in order to decode the encoded codeword using the modified modulation scheme.

8. The method of claim 4, wherein said determining further comprises:
accessing a memory containing at least one look-up table corresponding to the identified modulation scheme; and
applying said determined quality metric to the accessed look-up table to determine the modulation format supported by the communication medium.

9. The method of claim 1, wherein determining the estimate of the amount of mutual information comprises:
estimating, based on the identified modulation scheme and the determined quality metric, the amount of mutual information being received per unit of the received rateless encoded data.

10. An apparatus comprising:
a controller adapted to receive, on a communication medium, initial encoded data that has been encoded with a rateless code; and
a processor adapted (1) to determine a quality metric for the communication medium, (2) to identify a modulation scheme used in sending the initial encoded data on the communication medium, (3) to estimate, based on the identified modulation scheme and the determined quality metric, an amount of mutual information being received for the received rateless encoded data, wherein the amount of mutual information is useful for indicating whether a decoder is able to decode the received rateless encoded data; and (4) to determine an amount of mutual information being received based on the estimate.

11. The apparatus of claim 10 further comprising a memory storing a look-up table that includes an entry providing an estimate of an amount of mutual information received per unit time over a communication medium having a particular quality metric and using a particular modulation scheme, and wherein the processor is adapted to determine the estimate by:
accessing a look-up table based on the identified modulation scheme and the determined quality metric, and
accessing an entry in the accessed look-up table that provides the estimate of an amount of mutual information being received per unit of received encoded data.

12. The apparatus of claim 11, wherein the memory stores a plurality of look up tables (LUTs) corresponding to different modulation schemes that can be used on the communication medium.

13. The apparatus of claim 10, wherein said processor is configured to compare said determined quality metric with one of a plurality of LUTs corresponding to the identified modulation scheme.

14. The apparatus of claim 10, wherein said processor is configured to identify the modulation scheme by receiving a control signal identifying the modulation scheme being used on the communication medium.

15. The apparatus of claim 10, wherein said processor is further adapted to determine a modulation format supported by the communication medium using the determined quality metric.

16. The apparatus of claim 15, wherein said controller feeds back a modified modulation scheme based on the determined modulation format supported by the medium such that a subsequently received codeword encoded with a rateless code is modulated with the modified modulation scheme.

17. The method of claim 10, wherein the processor is adapted to estimate by:
estimating, based on the identified modulation scheme and the determined quality metric, the amount of mutual information being received per unit of the received rateless encoded data.

18. An apparatus comprising:
means for receiving initial encoded data that has been encoded with a rateless code;
means for determining a quality metric for a communication medium on which the initial encoded data has been received;
means for identifying a modulation scheme used in sending the initial encoded data on the communication medium;
means for estimating, based on the identified modulation scheme and the determined quality metric, an amount of mutual information being received for the received rateless encoded data, wherein the amount of mutual information is useful for indicating whether a decoder is able to decode the received rateless encoded data; and
means for determining an amount of mutual information being received based on the estimate.

19. The apparatus of claim 18, further comprising:
means for determining a modulation format supported by the communication medium based on the determined quality metric; and
means for receiving, based on the determined modulation format, subsequent mutual information for a codeword encoded with the rateless code.

20. The apparatus of claim 19, further comprising means for feeding back a modified modulation scheme based on the determined modulation format such that the subsequently received codeword is transmitted using said modified modulation scheme.

21. A program storage device having an application program tangibly embodied thereon, the application program including instructions for performing at least the following:
receiving initial encoded data that has been encoded with a rateless code;
determining a quality metric for a communication medium on which the initial encoded data has been received;
identifying a modulation scheme used in sending the initial encoded data on the communication medium;
estimating, based on the identified modulation scheme and the determined quality metric, an amount of mutual information being received for the received rateless encoded data, wherein the amount of mutual information is useful for indicating whether a decoder is able to decode the received rateless encoded data; and
determining an amount of mutual information being received based on the estimate.

22. The method of claim 21, wherein estimating comprises:
estimating, based on the identified modulation scheme and the determined quality metric, the amount of mutual information being received per unit of the received rateless encoded data.

* * * * *